US009995298B2

(12) United States Patent
Lim et al.

(10) Patent No.: US 9,995,298 B2
(45) Date of Patent: Jun. 12, 2018

(54) APPARATUS AND METHOD FOR CONTROLLING A LINEAR COMPRESSOR AND A LINEAR COMPRESSOR AND A REFRIGERATOR HAVING THE SAME

(71) Applicant: LG ELECTRONICS INC., Seoul (KR)

(72) Inventors: Sungjin Lim, Seoul (KR); Daegeun Park, Seoul (KR); Youngwoong Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 270 days.

(21) Appl. No.: 14/948,600

(22) Filed: Nov. 23, 2015

(65) Prior Publication Data

US 2016/0153442 A1 Jun. 2, 2016

(30) Foreign Application Priority Data

Nov. 27, 2014 (KR) ........................ 10-2014-0167718

(51) Int. Cl.
*F04B 49/06* (2006.01)
*F04B 49/20* (2006.01)
(Continued)

(52) U.S. Cl.
CPC .............. *F04B 49/20* (2013.01); *F04B 35/04* (2013.01); *F04B 35/045* (2013.01); *F04B 49/06* (2013.01);
(Continued)

(58) Field of Classification Search
CPC .... H02P 2205/01; H02P 25/06; H02P 25/062; H02P 25/064; F04B 2203/0212;
(Continued)

(56) References Cited

U.S. PATENT DOCUMENTS 6,289,680 B1 * 9/2001 Oh .................... F04B 49/065
417/45
6,960,893 B2 11/2005 Yoshida et al.
(Continued)

FOREIGN PATENT DOCUMENTS

CN 1242169 2/2006
CN 1242547 2/2006
(Continued)

OTHER PUBLICATIONS

European Search Report dated May 10, 2016.
(Continued)

*Primary Examiner* — Charles Freay
*Assistant Examiner* — Thomas Fink
(74) *Attorney, Agent, or Firm* — Ked & Associates LLP

(57) ABSTRACT

An apparatus and method for controlling a linear compressor and a linear compressor and a refrigerator having the same are provided. The apparatus may include a drive configured to drive the linear compressor based on a control signal, a detector configured to detect a motor current of the linear compressor, an asymmetric current generator configured to generate an asymmetric motor current by applying a current offset to the detected motor current, and a controller configured to generate the control signal based on the asymmetric motor current. The current offset may be changed based on a change in a position of a piston of the linear compressor.

20 Claims, 23 Drawing Sheets

(51) Int. Cl.
*F04B 35/04* (2006.01)
*F04B 53/14* (2006.01)
*F04B 51/00* (2006.01)
*F04B 49/12* (2006.01)
*H02K 33/06* (2006.01)
*H02K 7/14* (2006.01)

(52) U.S. Cl.
CPC .............. *F04B 49/12* (2013.01); *F04B 51/00* (2013.01); *F04B 53/14* (2013.01); *H02K 7/14* (2013.01); *H02K 33/06* (2013.01); *F04B 2201/02* (2013.01); *F04B 2203/0401* (2013.01); *F04B 2203/0402* (2013.01)

(58) Field of Classification Search
CPC .......... F04B 2203/0401; F04B 2201/02; F04B 2201/0206; F04B 49/12; F04B 17/04; F04B 35/045
See application file for complete search history.

(56) References Cited

U.S. PATENT DOCUMENTS

| | | | | |
|---|---|---|---|---|
| 7,456,592 | B2* | 11/2008 | Yoo | F04B 35/045 |
| | | | | 318/119 |
| 2002/0150477 | A1 | 10/2002 | Hwang et al. | |
| 2003/0133807 | A1* | 7/2003 | Heo | F04B 49/065 |
| | | | | 417/44.11 |
| 2003/0161734 | A1* | 8/2003 | Kim | F04B 35/045 |
| | | | | 417/44.1 |
| 2004/0005222 | A1 | 1/2004 | Yoshida et al. | |
| 2005/0158178 | A1* | 7/2005 | Yoo | F04B 49/065 |
| | | | | 417/45 |
| 2006/0257264 | A1* | 11/2006 | Kim | F04B 35/045 |
| | | | | 417/44.1 |
| 2007/0241697 | A1* | 10/2007 | Sung | F04B 35/045 |
| | | | | 318/135 |
| 2009/0047154 | A1 | 2/2009 | Choi et al. | |

FOREIGN PATENT DOCUMENTS

| | | |
|---|---|---|
| CN | 1292532 | 12/2006 |
| CN | 10-0400870 | 7/2008 |
| CN | 10-1305512 | 11/2008 |
| EP | 1 669 602 | 6/2006 |
| KR | 2003-0061531 | 7/2003 |
| KR | 10-2004-0049583 | 6/2004 |
| KR | 10-2007-0092027 | 9/2007 |
| KR | 2009-0090248 | 8/2009 |
| KR | 10-1436642 | 9/2014 |

OTHER PUBLICATIONS

Korean Office Action dated Jul. 1, 2016.
Chinese Office Action dated Feb. 28, 2017 issued in Application No. 201510848581.9 (English Translation included).
Korean Office Action dated Feb. 24, 2016.

* cited by examiner

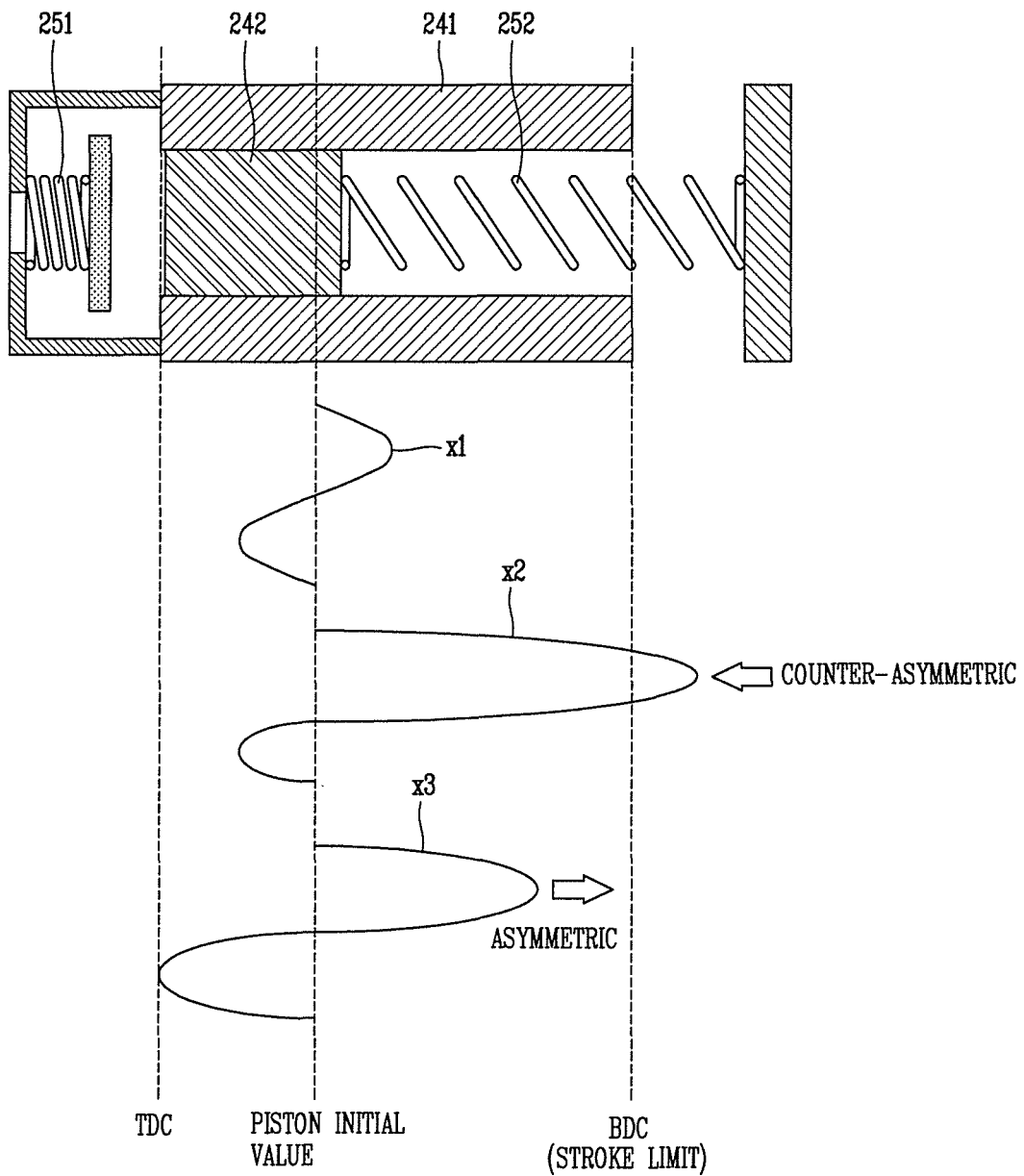

APPARATUS AND METHOD FOR CONTROLLING A LINEAR COMPRESSOR AND A LINEAR COMPRESSOR AND A REFRIGERATOR HAVING THE SAME

CROSS-REFERENCE TO RELATED APPLICATION(S)

Pursuant to 35 U.S.C. § 119(a), this application claims the benefit of earlier filing date and right of priority to Korean Application No. 10-2014-0167718, filed in Korea on Nov. 27, 2014, the contents of which is incorporated by reference herein in its entirety.

BACKGROUND

1. Field

An apparatus and method for controlling a linear compressor and a linear compressor and a refrigerator having the same are disclosed herein.

2. Background

Compressors typically refer to mechanisms that increases pressure by compressing a refrigerant or other various operating gases, and are widely used in refrigerators and air conditioners. The compressors may be classified into a reciprocating compressor, in which a compression space, into and from which an operating gas, such as a refrigerant, is suctioned and discharged, is formed between a piston and a cylinder and the refrigerant is compressed as the piston linearly reciprocates in the cylinder; a rotary compressor, in which a compression space, into and from which an operating gas, such as a refrigerant, is suctioned and discharged, is formed between an eccentrically-rotatable roller and the cylinder and a refrigerant is compressed as the roller eccentrically rotates along an inner wall of the cylinder; and a scroll compressor, in which a compression space, into and from which an operating gas, such as a refrigerant, is suctioned and discharged, is formed between an orbiting scroll and a fixed scroll and the refrigerant is compressed as the orbiting scroll rotates along the fixed scroll.

The reciprocating compressor may be divided into a recipro type and a linear type according to a method of driving the piston. The recipro type reciprocating compressor employs a method in which a crank shaft is coupled to a rotary motor and a piston is coupled to the crank shaft so as to convert a rotational motion of the rotary motor into a linear reciprocating motion. On the other hand, the linear type reciprocating compressor employs a method in which a piston is directly connected to a mover of a linear motor to perform a reciprocating motion in response to a linear motion of the motor.

The linear type reciprocating compressor does not employ the crank shaft, which converts the rotational motion into the linear motion, and thus, it exhibits less frictional loss and a higher compression efficiency than the recipro type reciprocating compressor. When the reciprocating compressor is used for a refrigerator or an air conditioner, a compression ratio of the reciprocating compressor may be changed by varying a voltage applied to the reciprocating compressor, thereby controlling a cooling capacity (freezing capacity).

FIG. 1 is a block diagram of a compressor control apparatus of a related art reciprocating compressor. As illustrated in FIG. 1, the apparatus for controlling a linear compressor 200 may include a voltage detector 3 to detect a voltage applied to a motor, a current detector 4 to detect a current applied to the motor, a stroke estimator 5 to estimate a stroke based on the detected motor current and motor voltage, and parameters of the motor, a comparator 1 to compare the stroke estimate with a stroke command value to output a difference signal accordingly, and a controller 2 to control the stroke by varying the voltage applied to the motor according to the difference signal.

Hereinafter, an operation of the related art compressor control apparatus will be described.

First, the voltage detector 3 and the current detector 4 detect a motor voltage and a motor current applied to the motor, respectively. The stroke estimator 5 calculates a stroke estimate by applying the motor current, the motor voltage, and parameters of the motor to Equation 1, and applies the calculated stroke estimate to the comparator 1.

$$x = \frac{1}{\alpha} \int \left( V_m - R i_m - L \frac{di_m}{dt} \right) dt \quad \text{[Equation 1]}$$

where R denotes resistance, L denotes inductance, and a denotes a motor constant or counter (or back) electromotive force constant.

Accordingly, the comparator 1 compares the stroke estimate with the stroke command value and applies the comparison result to the controller 2. The controller 2 then controls the stroke by varying the voltage applied to the motor according to the difference. That is, the controller 2, as illustrated in FIG. 2, may decrease the motor voltage when the stroke estimate is greater than the stroke command value (S4), and increase the motor voltage when the stroke estimate is smaller than the stroke command value (S5).

A refrigerator as a home appliance runs continuously (24 hours per day), and thus, power consumption of the refrigerator may be a most important technical consideration in the field of refrigerator technology. Efficiency of a compressor may have the greatest influence on the power consumption of the refrigerator, and the efficiency of the compressor should be increased in order to reduce the power consumption of the refrigerator.

One way in which to increase the efficiency of the linear compressor is to reduce frictional loss. To reduce frictional loss, an initial value (or an initial position) of the piston (a location at which the piston is located in the cylinder in an assembled or stopped state) may be moved toward a compression space of the cylinder (or toward a top dead center), so as to decrease a stroke.

However, the initial value of the piston is a factor that determines a maximum cooling capacity. Reduction of the initial value may result in an increase in efficiency of the compressor based on the reduction in frictional loss, but may result in a reduction in the maximum cooling capacity, making it difficult to handle (manage) an overload.

When the initial value of the piston is moved opposite to or away from the compression space, the maximum cooling capacity of the compressor may increase, but a moving distance (a distance between a top dead center and a bottom dead center) of the piston increases. This brings about an increase in frictional loss between the cylinder and the piston, and accordingly, reduces efficiency of the compressor.

The top dead center is abbreviated as "TDC", and may physically indicate a position of the piston within the cylinder upon completion of a compression stroke of the piston. A point of which the TDC is 0 (TDC=0) (or a point at which a distance from an end of the cylinder (a discharge valve within the cylinder) to an end of the piston is 0) is simply referred to as 'top dead center.' Similarly, the bottom dead center is abbreviated as "BDC" and may physically indicate a location upon completion of a suction stroke of the piston.

Consequently, the efficiency of the compressor and the maximum cooling capacity with respect to the initial value of the piston may have a trade-off relationship. Therefore, development of technology for ensuring control stability of the compressor and improving the efficiency of the compressor using the initial value of the piston is necessarily required.

BRIEF DESCRIPTION OF THE DRAWINGS

Embodiments will be described in detail with reference to the following drawings in which like reference numerals refer to like elements, and wherein:

FIG. 8 is a view illustrating a change in movement of a piston according to a symmetric control, an asymmetric control, and a counter-asymmetric control in accordance with an embodiment;

DETAILED DESCRIPTION

Embodiments disclosed herein relate to an apparatus and method for controlling a motor of a linear compressor, and may be used for, but are not limited to, a compressor applied to a refrigerator or an air conditioner, for example. The embodiments disclosed herein may also be applicable to various electronic devices to which an apparatus for controlling a compressor can be applied.

It should be noted that technological terms used herein are merely used to describe embodiments, but are not to limit the embodiments disclosed herein. Also, unless particularly defined otherwise, technological terms used herein should be construed as a meaning generally understood by those having ordinary skill in the art to which the embodiments disclosed herein pertain, and should not be construed too broadly or too narrowly. Further, if technological terms used herein are wrong terms unable to correctly express the spirit of the embodiments disclosed herein, then they should be replaced by technological terms that are properly understood by those skilled in the art. In addition, general terms used in the embodiments disclosed herein should be construed based on the definition of a dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Further, the terms including an ordinal number, such as first, second, etc., can be used to describe various elements, but the elements should not be limited by those terms. The terms are used merely for the purpose to distinguish an element from the other element. For example, a first element may be named to a second element, and similarly, a second element may be named to a first element without departing from the scope of right.

Figure 1:
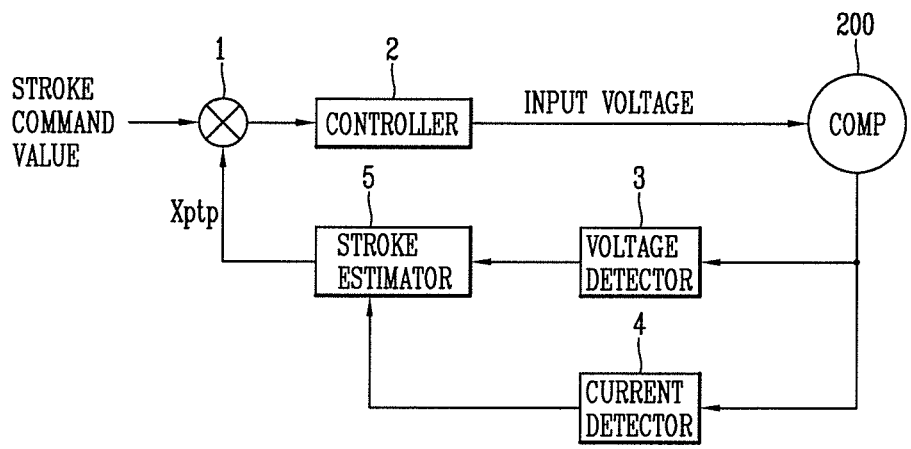
FIG. 1 is a block diagram of a compressor control apparatus of a related art reciprocating compressor.
Figure 2:
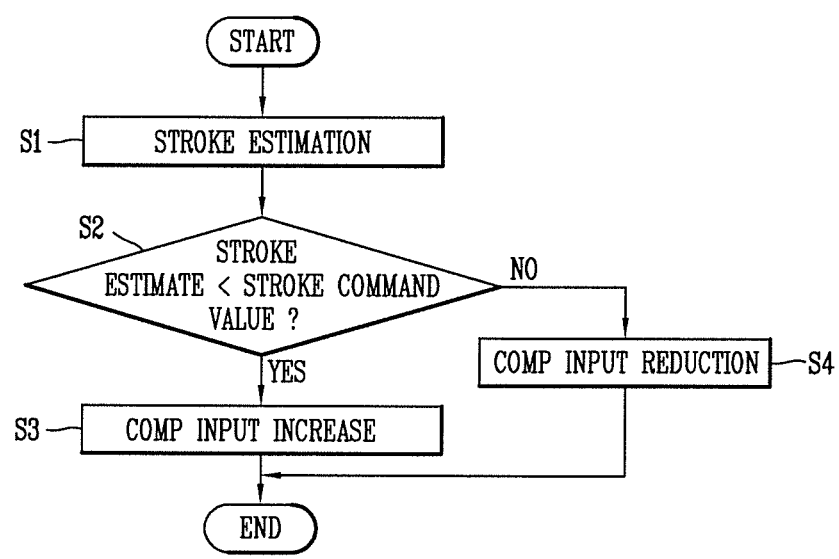
FIG. 2 is an operation flowchart of a method for controlling a related art reciprocating compressor.
Figure 3:
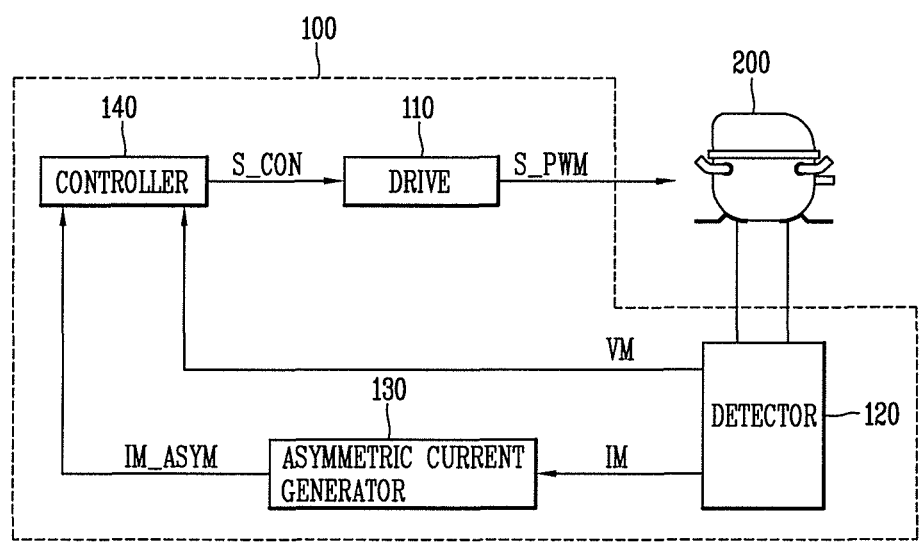
FIG. 3 is a block diagram of an apparatus for controlling a linear compressor in accordance with an embodiment.

FIG. 3 is a block diagram of an apparatus for controlling a linear compressor in accordance with an embodiment. As illustrated in FIG. 3, apparatus 100 for controlling a linear compressor according to an embodiment may include a driving unit or drive 110 to drive a linear compressor 200 based on a control signal, a detector 120 to detect a motor current and/or a motor voltage corresponding to the motor of the linear compressor 200, an asymmetric current generator 130 to generate an asymmetric motor current by applying a current offset to the detected motor current, and a controller 140 to generate the control signal based on the asymmetric motor current and/or the detected motor voltage. The current offset may be varied based on a change in a position of a piston.

It is understood that implementing all of the illustrated components of the apparatus for controlling the linear compressor illustrated in FIG. 3 is not a requirement, and that greater or fewer components may alternatively be implemented.

Hereinafter, each component will be described.

The drive 110 may generate a motor driving signal S_PWM based on a control signal S_CON applied from the controller 140, and apply the motor driving signal S_PWM to the linear compressor 200 to drive the linear compressor 200. The motor driving signal S_PWM may be in the form of an alternating current (AC) voltage or AC current.

The drive 110 may include an inverter or a triac. Hereinafter, the drive 110 having an inverter will be described with reference to FIGS. 4A and 4B.

Figure 4A:
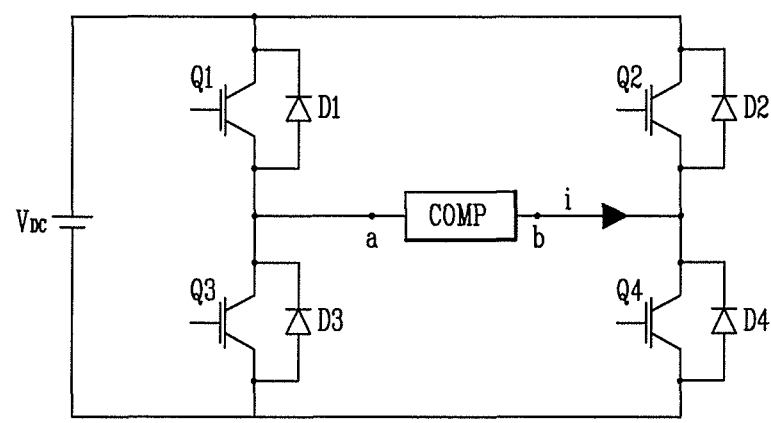
FIG. 4A is a view of a drive for illustrating an operation of a drive including an inverter according to an embodiment.
Figure 4B:
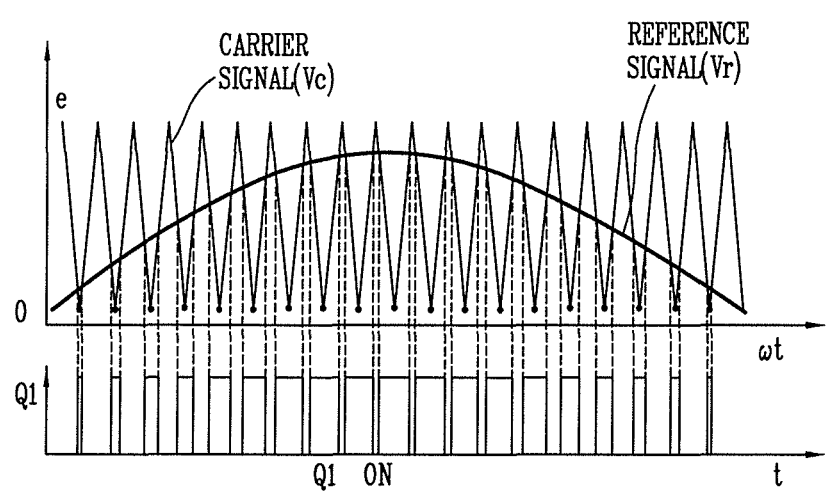
FIG. 4B is a graph illustrating a process of generating a driving signal for illustrating an operation of a drive including an inverter according to an embodiment.

FIG. 4A is a view of a drive for illustrating an operation of a drive including an inverter according to an embodiment. FIG. 4B is a view illustrating a process of generating a driving signal for illustrating an operation of a drive including an inverter according to an embodiment.

As illustrated in FIG. 4A, the drive 110 may include a full-bridge type inverter module, for example. The full-bridge type inverter module, as illustrated in FIG. 4A, may include four switching elements Q1 to Q4. The full-bridge type inverter module may further include diodes D1 to D4 as freewheels, which may be connected in parallel to the four switching elements Q1 to Q4, respectively. The switching elements Q1 to Q4 may be at least one of an insulated gate bipolar transistor (IGBT), a metal-oxide semiconductor field-effect transistor (MOSFET), or a bipolar junction transistor (BJT).

The controller 140 may output the control signal S_CON to the drive 110 in the form of a voltage control signal, which may be generated by a pulse width modulation (PWM). Explaining the PWM method, as illustrated in FIG. 4B, in order for a current to flow to the compressor COMP in a forward direction (node a→node b), the switching elements Q1 and Q4 may be turned on and the switching elements Q2 and Q3 may be turned off. On the other hand, in order for a current to flow in a backward direction (node b→node a), the switching elements Q1 and Q4 may be turned off and the switching elements Q2 and Q3 may be turned on.

Referring to FIG. 4B, two signals are required for modulating a pulse width of the control signal C_CON to drive the motor of the linear compressor. One may be a carrier signal Vc and the other may be a reference signal Vr.

The carrier signal may use a chopping wave, and the reference signal having a form of a sine wave may serve as a command value for controlling the drive 110. In accordance with an embodiment, the reference signal may be a table voltage, which may be output on a constant frequency on the sin table basis. That is, the reference signal may have the form of a sine wave in a periodic discrete time area.

Therefore, the controller 140 may control the linear compressor 200 in a manner of adjusting a size, a shape, and a DC average value (or a DC offset value) of the reference signal. Therefore, the controller 140 may generate the control signal S_CON for controlling a switching element to be turned on when the reference signal is greater than the carrier signal and to be turned off when the reference signal is less than the carrier signal.

When the reference signal or a voltage command value is increased, a portion by which the reference signal is greater than the carrier signal is increased, which may extend a turn-on time of the switching element. This may result in an increase in a size (or a magnitude) of a voltage or current applied to the motor.

Hereinafter, the drive 110 having a triac will be explained with reference to FIG. 5.

Figure 5:
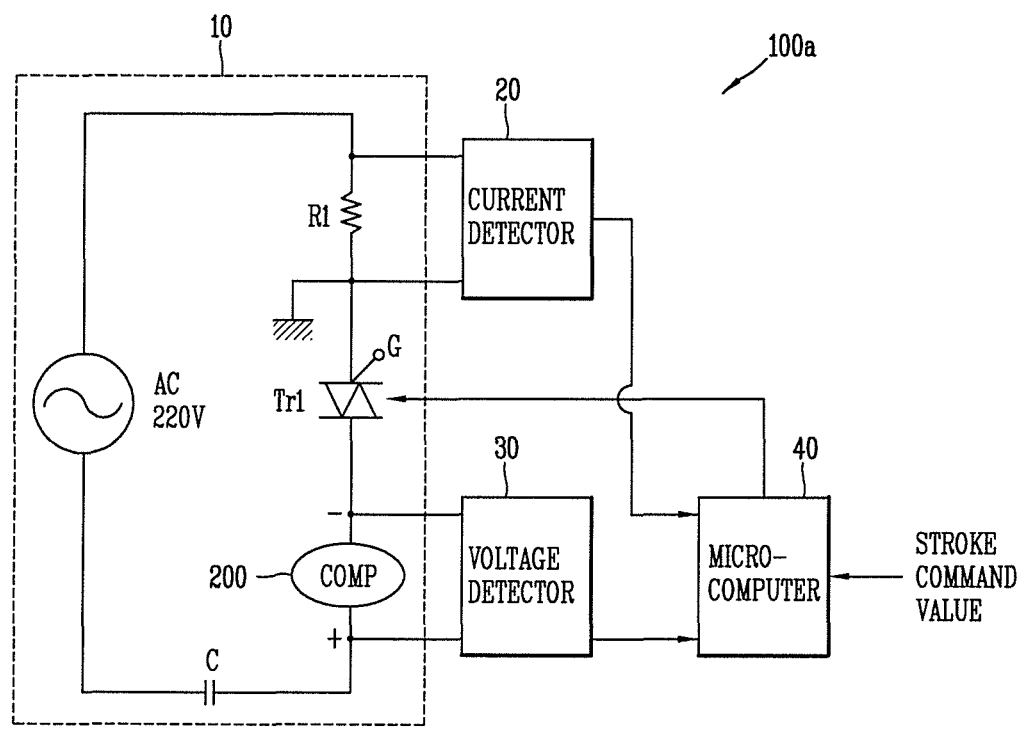
FIG. 5 is a block diagram of an apparatus for controlling a linear compressor using a triac according to an embodiment.

FIG. 5 is a block diagram of an apparatus for controlling a linear compressor using a triac according to an embodiment. The apparatus 110a using a triac is an apparatus for controlling linear compressor 200, which may adjust a cooling capacity by varying a stroke in a manner of moving a piston up and down in response to a stroke voltage according to a stroke command value.

As illustrated in FIG. 5, the apparatus 100a of FIG. 5 may include a voltage detector 30 to detect a voltage generated in the linear compressor 200 in response to an increase in a stroke by a stroke voltage, a current detector 20 to detect a current applied to the linear compressor 200 in response to the increase in the stroke by the stroke voltage, a microcomputer 40 to calculate the stroke based on the voltage and the current detected by the voltage detector 30 and the current detector 20, compare the calculated stroke with a stroke command value, and output a switching control signal according to the comparison result, and an electric circuit 10 to apply the stroke voltage to the linear compressor 200 by switching on or off a triac Tr1 using an AC power source according to the switching control signal of the microcomputer 40. The current detector 20, the voltage detector 30, and the microcomputer 40 may be implemented as one controller (or one-chip), and in this sense, those components may be components corresponding to the controller 140 according to the previous embodiment.

An operation of the apparatus 100a of FIG. 5 using the triac will now be described. First, the piston of the linear compressor 200 may perform a linear motion by the stroke voltage according to a stroke command value set by a user, and accordingly a stroke may be varied, thereby adjusting a cooling capacity. A turn-on period of the triac Tr1 of the electric circuit 10 may be extended according to the switching control signal of the microcomputer 40 and responsively the stroke may be increased. The voltage detector 30 and the current detector 20 may detect the voltage and the current, respectively, generated in the linear compressor 200, and apply the detected voltage and current to the microcomputer 40.

The microcomputer 40 may then compute a stroke using the voltage and the current detected by the voltage detector 30 and the current detector 20, and compare the computed stroke with the stroke command value, to output a switching control signal according to the comparison result. That is, when the computed stroke is smaller than the stroke command value, the microcomputer 40 may output the switching control signal for extending the turn-on period of the triac Tr1 to increase the stroke voltage applied to the linear compressor 200.

The current detector 120 of the apparatus 100a according to this embodiment may detect a motor current Im and a motor voltage Vm corresponding to a motor of the linear compressor 200. The detector 120 may include a current detecting portion (not illustrated), which may detect the motor current Im, and a voltage detecting portion (not illustrated), which may detect the motor voltage Vm.

The current detecting portion may detect a motor current applied to the motor of the linear compressor 200 according to a load of the linear compressor 200 or a load of a refrigerating system, for example, a refrigerator, with the linear compressor 200. The motor current Im may refer to a current applied to the motor of the linear compressor 200, and may be detected by a current sensor, or a current measuring instrument, for example.

The voltage detecting portion may detect a motor voltage applied between both ends of the motor of the linear compressor 200 according to the load of the linear compressor 200 or the load of the refrigerating system, for example, the refrigerator, with the linear compressor 200. The motor voltage Vm may refer to a voltage applied to the motor of the linear compressor 200, and may be detected by a voltage sensor (configured as a voltage differential amplifier, for example), or a voltage measuring instrument, for example.

When the load of the linear compressor 200 is increased, that is, when a high cooling capacity is required, the asymmetric current generator 130 of the apparatus 100*a* according to an embodiment may generate an asymmetric motor current to perform an asymmetric control for increasing the maximum cooling capacity by electrically moving an initial value of the piston toward a bottom dead center by a predetermined distance (or value). Or, when an impact is applied to the piston because the piston moving toward the bottom dead center exceeds a stroke peak or a mechanical limit, the asymmetric current generator 130 may generate the asymmetric motor current to perform a counter-asymmetric control for preventing the impact applied to the piston by moving the initial value of the piston toward a top dead center by a predetermined distance (or value).

Among other terms used in this specification, the term "counter-asymmetric control" is different from "asymmetric control." A current offset applied to perform the counter-asymmetric control and a current offset applied to perform the asymmetric control may have different signs from each other, and the initial value of the piston according to such current offsets may be present in a different direction from an initial value of the piston when a current offset is not applied (or when the current offset is '0').

Figure 6:
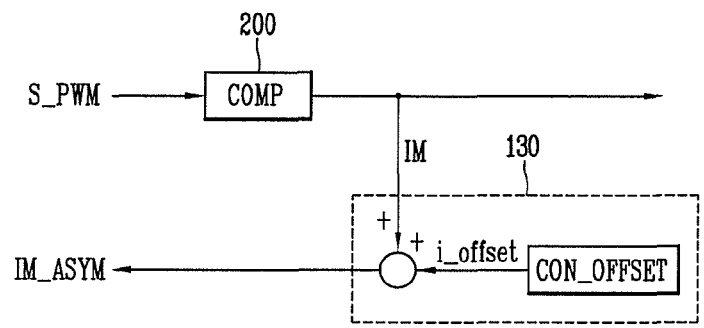
FIG. 6 is a conceptual view illustrating generation of an asymmetric motor current in accordance with an embodiment.

FIG. 6 is a conceptual view illustrating generation of an asymmetric motor current in accordance with an embodiment. As illustrated in FIG. 6, the asymmetric current generator 130 may generate an asymmetric motor current Im_asym by applying a current offset i_offset to the motor current Im detected by the detector 120. In order to apply the current offset i_offset to the detected motor current Im, the asymmetric control generator 130 may add the current offset i_offset to the detected motor current Im using an adder or subtract the current offset i_offset from the detected motor current Im using a subtractor. A sign of the current offset i_offset may not specifically be limited.

Accordingly, the asymmetric current generator 130 may include a current offset controller CON_OFFSET to generate the current offset i_offset. The current offset controller CON_OFFSET may also be referred to as a push-back controller, which may control a push(ed) amount of the piston by the asymmetric control based on the current offset. The current offset controller CON_OFFSET may determine the current offset I_offset according to a specific condition, and transfer the determined current offset I_offset to the adder or subtractor.

The specific condition according to which the current offset controller CON_OFFSET determines the current offset I_offset may include at least one of a load of the linear compressor, a cooling capacity command value applied to the linear compressor, or an operation mode of the linear compressor. Also, the specific condition may further include at least one of a stroke asymmetry ratio based on an initial value of the piston for the counter-asymmetric control, a comparison result between a motor current and a preset or predetermined motor current peak value, a comparison result between a detected stroke and a preset or predetermined stroke peak value, or a detected top dead center.

In accordance with an embodiment, the current offset controller CON-OFFSET may store current offset values according to the specific condition in a lookup table. When the specific condition is determined or applied from an exterior device, for example, a main controller or a micom of a refrigerator, the current offset controller CON_OFFSET may determine a current offset value I_offset using the lookup table. For example, the current offset controller CON_OFFSET may set the current offset i_offset to '0' in a cooling capacity driving (operating) zone of 10 to 20 watts, such that the symmetric control (symmetric control mode) may be executed. Also, the current offset controller CON_OFFSET may set the current offset i_offset to a specific value, which may be differentially increased according to a specific constant value or an increase in a cooling capacity, in a cooling capacity driving zone over 20 watts. In accordance with another embodiment, the current offset controller CON_OFFSET may gradually increase or reduce the current offset i_offset by accumulatively adding or subtracting a unit current offset of a preset or predetermined size according to the specific condition.

Figure 7A:
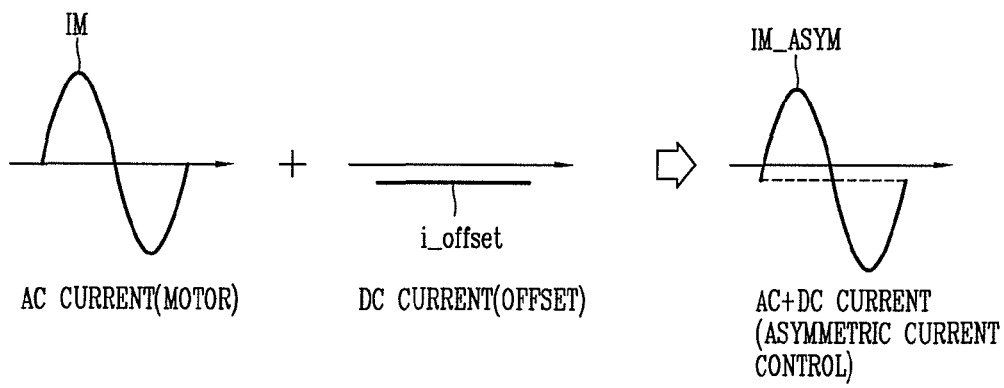
FIGS. 7A and 7B are views illustrating a process of generating an asymmetric motor current in accordance with an embodiment.
Figure 7B:
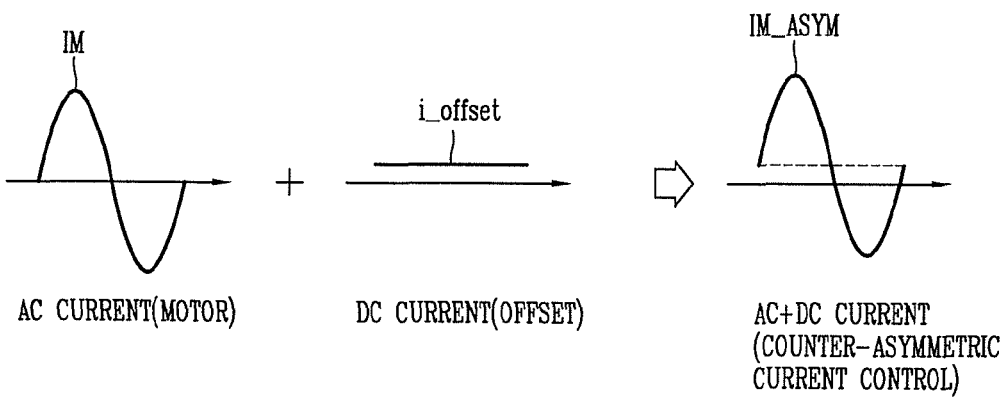

FIGS. 7A and 7B are views illustrating a process of generating an asymmetric motor current in accordance with an embodiment. As discussed above, the asymmetric current generator 130 may generate an asymmetric motor current Im_ASYM by applying the current offset i_offset determined by the current offset controller CON_OFFSET to the motor current Im detected by the detector 120. That is, the current offset controller CON_OFFSET, as illustrated in FIG. 7A, may generate an asymmetric motor current Im_ASYM by adding a current offset i_offset having a DC waveform to a detected motor current Im having an AC waveform, or as illustrated in FIG. 7B, may generate an asymmetric motor current Im_ASYM by adding a current offset i_offset having a DC waveform to a detected motor current Im having an AC waveform. The current offset i_offset may have a predetermined positive or negative value.

Therefore, in order to move the initial value of the piston toward the bottom dead center such that the controller 140 may perform the asymmetric control, the asymmetric current generator 130 may include an adder for adding a negative current offset i-offset to the motor current Im, or a subtractor for subtracting a positive current offset i_offset from the motor current Im, so as to generate the asymmetric motor current Im_ASYM for performing the asymmetric control (see FIG. 7A). Also, in order to move the initial value of the piston toward the top dead center such that the controller 140 may perform the counter-asymmetric control, the asymmetric current generator 130 may include an adder for adding a positive current offset i_offset to the motor current Im or a subtractor for subtracting a negative current offset i_offset from the motor current Im, so as to generate the asymmetric motor current Im_ASYM for performing the asymmetric control (see FIG. 7B).

That is, the controller 140 may set the initial value of the piston by an electric control, other than a mechanical control, using the current offset. When the current offset value is large, the initial value of the piston may move more toward the top dead center or the bottom dead center, which may result in an increase in an outputtable maximum cooling capacity.

Also, when the current offset value is large, an average position (or a central or middle position) of the piston, which performs the reciprocating motion, may be moved more toward the top dead center or the bottom dead center from an initial position of the piston to which the current offset is not applied. When a large negative current offset is used, an asymmetric control amount may increase (or a push amount may increase), and accordingly, a reciprocating distance of the piston may be increased, which may result in an increase in the outputtable maximum cooling capacity. On the other hand, when a large positive current offset is used, a counter-asymmetric control amount may increase (or the push amount may be reduced). This may prevent the piston from moving over a stroke peak so as to prevent an impact from being applied to the compressor due to the piston, thereby increasing durability of the compressor or preventing noise generation due to the impact. In addition, stiffness of a spring that elastically supports the piston may be reduced or the spring may be removed, which may allow the compressor to be driven at a lower operating frequency, thereby improving efficiency of the compressor.

That is, the apparatus for controlling a linear compressor according to an embodiment may generate the control signal for driving the compressor based on the asymmetric motor current, which may be generated using the current offset, and accordingly, change the initial position of the piston according to circumstances, thereby increasing an allowable cooling capacity of the compressor or improving efficiency of the compressor. On the other hand, when the controller 140 performs the counter-asymmetric control, the piston may exceed the point at which the top dead center is '0,' and thereby, an impact may be applied to an end of the cylinder in a direction of the discharge valve. However, this may be prevented by additionally applying a top dead center control method to be discussed hereinafter. Also, the controller 140 may first reduce a size of the stroke before performing the counter-asymmetric control, thereby preventing the piston from applying an impact to the end of the cylinder in the direction of the discharge valve.

Figure 9A:
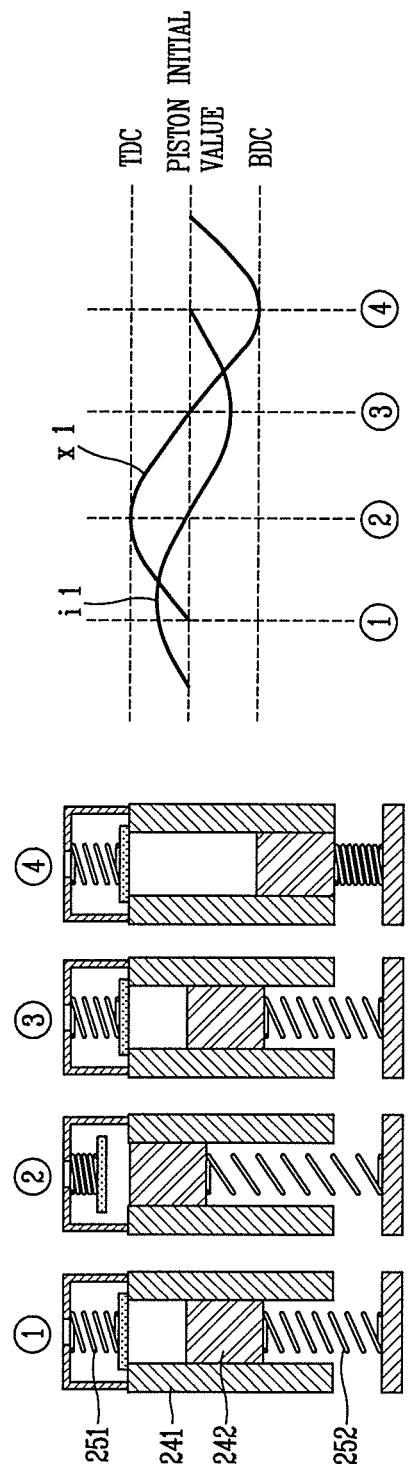
FIGS. 9A to 9C are views illustrating a change in movement of a piston and a motor current according to the symmetric control, the asymmetric control, and the counter-asymmetric control in accordance with an embodiment.
Figure 9B:
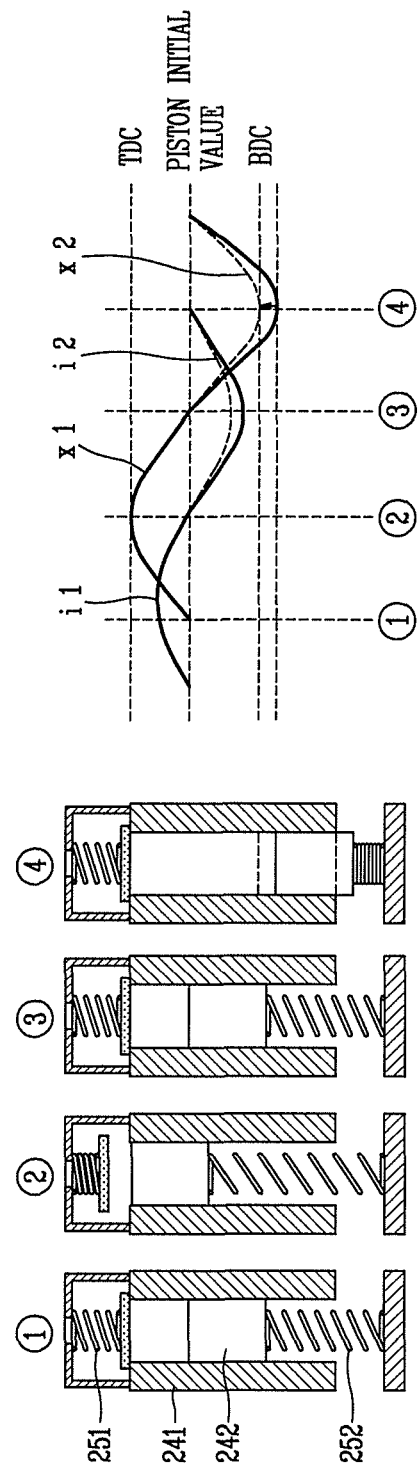
Figure 9C:
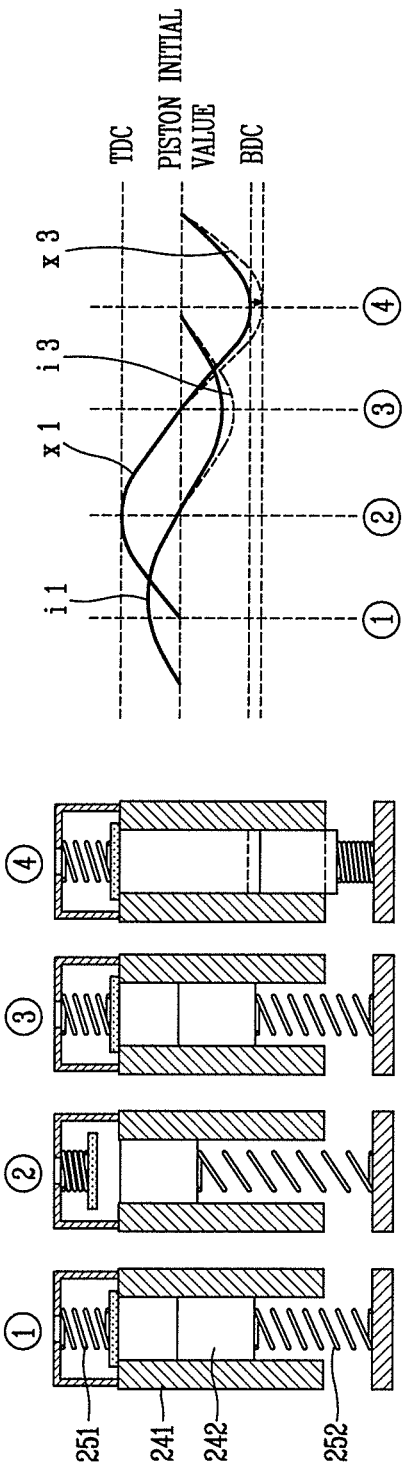

FIG. 8 is a view illustrating a change in movement of a piston according to a symmetric control, an asymmetric control, and a counter-asymmetric control in accordance with an embodiment. FIGS. 9A to 9C are views illustrating a change in movement of a piston and a motor current according to the symmetric control, the asymmetric control, and the counter-asymmetric control in accordance with an embodiment.

As illustrated in FIGS. 8 and 9A, a piston 242 according to a symmetric control may perform a reciprocating motion along a path of x1 in the order of ① to ④ within a cylinder 241 on a time basis. That is, the piston 242 according to the symmetric control may be moved toward a top dead center during a compression stroke by a same distance as a distance by which it is moved toward a bottom dead center during a suction stroke, based on an initial value of the piston 242 to which a current offset is not applied.

A motor current i1 generated by the asymmetric current generator 130 may have a symmetric waveform based on a zero ('0') current, and the compressor may be driven based on the symmetric motor current i1. However, during the symmetric control, when the motor current increases and a stroke increases according to a load of the compressor or a cooling capacity command value applied to the compressor, a push amount of the piston 242 may be increased due to gas condensation through the compression stroke of the piston 242. Also, when a stiffness of a spring 252, which may be installed to elastically support the piston 242 in a motion direction of the piston 242, is reduced or the spring 252 is removed, the push amount of the piston 242 may be increased. Accordingly, the piston moving toward the bottom dead center may exceed the stroke peak or mechanical limit, thereby being exposed to an impact. Also, upon performing a maximum stroke operation by the asymmetric control, which is discussed hereinafter, even when the push amount of the piston 242 is increased due to the gas condensation or the low stiffness of the spring 252, the piston 242 moving toward the bottom dead center may exceed the stroke peak or mechanical limit, thereby being exposed to the impact.

Therefore, to solve those problems, the controller 140 may control the linear compressor according to the counter-asymmetric control. As illustrated in FIGS. 8 and 9B, the piston 242 according to the counter-symmetric control may perform a reciprocating motion along a path of x2 in the order of ① to ④ within the cylinder 241 on a time basis. That is, the initial value of the piston 242 may be moved toward the top dead center to prevent an impact from being applied to the piston 242, which may result from when the piston 242 moving toward the bottom dead center exceeds the stroke peak or mechanical limit due to an increased push amount of the piston 242 according to the symmetric control or asymmetric control.

Accordingly, as illustrated in FIG. 7B, the asymmetric motor current Im_ASYM, which may be obtained by adding the positive current offset i_offset to the motor current Im or subtracting the negative current offset i_offset from the motor current Im, may be generated. Of course, as illustrated in FIG. 7A, the size of the negative current offset i_offset added upon the asymmetric control or the positive current offset i_offset subtracted upon the asymmetric control may be reduced.

However, upon the counter-asymmetric control, the initial value of the piston 242 may be moved toward the top dead center by the current offset i_offset, such that a middle point (mid-position or an average position) of a moved distance by a suction-compression stroke of the piston 242 may be located at a point adjacent to the top dead center. Therefore, when the controller 140 performs the counter-asymmetric control, in order to solve the problem that the piston 242 may exceed the point at which the top dead center is '0', and thereby, apply an impact to the end of the cylinder 241 in the direction of the discharge valve, the controller 140 may additionally apply the top dead center control method, which is discussed hereinafter. Or, the controller 140 may first reduce a size of the stroke before performing the counter-asymmetric control.

Also, in the apparatus 100 for controlling a linear compressor according to an embodiment, in order for the compressor 200 to perform a maximum stroke operation by ensuring a maximum compression volume in a manner of increasing a push amount of the piston 242 in a driving zone required for a high cooling capacity or a high-load driving zone with a large compressor load, as illustrated in FIGS. 8 and 9C, the piston 242 according to the asymmetric control performs a reciprocating motion along a path x3 in the order of ① to ④ within the cylinder 241 on a time basis. That is, to perform the maximum stroke driving by increasing the push amount of the piston, the initial value of the piston may be moved toward the bottom dead center. Accordingly, as illustrated in FIG. 7A, the asymmetric motor current Im_ASYM, which may be obtained by adding the negative current offset i_offset to the motor current Im or subtracting the positive current offset i_offset from the motor current Im, may be generated.

According to an embodiment, the controller 140 may control the linear compressor 200 according to at least one of the symmetric control, the asymmetric control, and the counter-asymmetric control based on the asymmetric motor current Im-ASYM and the motor voltage Vm detected from the compressor. That is, the controller 140 may generate the control signal S_CON based on the asymmetric motor current Im_ASYM and the detected motor voltage Vm, and control the drive 110.

The controller 140 may detect a stroke based on the asymmetric motor current Im_ASYM and the detected motor voltage Vm, and generate the control signal S_CON based on the detected stroke. Accordingly, the controller 140 may compare the detected stroke with a stroke command value, and generate the control signal S_CON based on the comparison result. This compressor control method may be referred to as "a stroke control method". This stroke control method may be similar to the previous control method described above, so repetitive description thereof has been omitted.

According to another embodiment, the controller 140 may control an output power of the linear compressor 200 based on a phase of the detected asymmetric motor current Im_ASYM or a gas spring constant. The controller 140 may detect a phase difference between a phase of the asymmetric motor current Im_ASYM and a phase of the detected stroke, and generate the control signal S_CON such that the output power of the linear compressor 200 may be controlled based on the phase difference. This compressor control method may be referred to as a "compressor power control method based on a phase difference".

Also, the controller 140 may detect the top dead center of the piston 241 based on a phase of the detected asymmetric motor current or the gas spring constant, and control the linear compressor 200 based on the detected top dead center. The controller 140 may detect a phase difference between the phase of the detected asymmetric motor current Im_ASYM and a phase of the detected stroke, detect a top dead center of the linear compressor 200 based on the phase difference, and generate the control signal S_CON based on the detected top dead center. This compressor control method may be referred to as a "top dead point control method based on a phase difference".

The controller 140 may detect a gas spring constant Kgas of gas suctioned into a compression space of the linear compressor 200, on the basis of the phase difference, the asymmetric motor current Im_ASYM, and the stroke detected based on the asymmetric motor current Im_ASYM and the detected motor voltage Vm. The controller 140 may generate the control signal S_CON such that the output power of the linear compressor 200 may be controlled based on the gas spring constant Kgas. Or, the controller 140 may detect a top dead center of the linear compressor 200 based on the spring constant and generate the control signal S_CON based on the detected top dead center. This compressor control method may be referred to as a "compressor power control or top dead center control method based on the gas spring constant".

Hereinafter, as one example of the top dead center control method, the top dead center control method based on the phase difference or the gas spring constant will be described with reference to FIG. 16.

Figure 16:
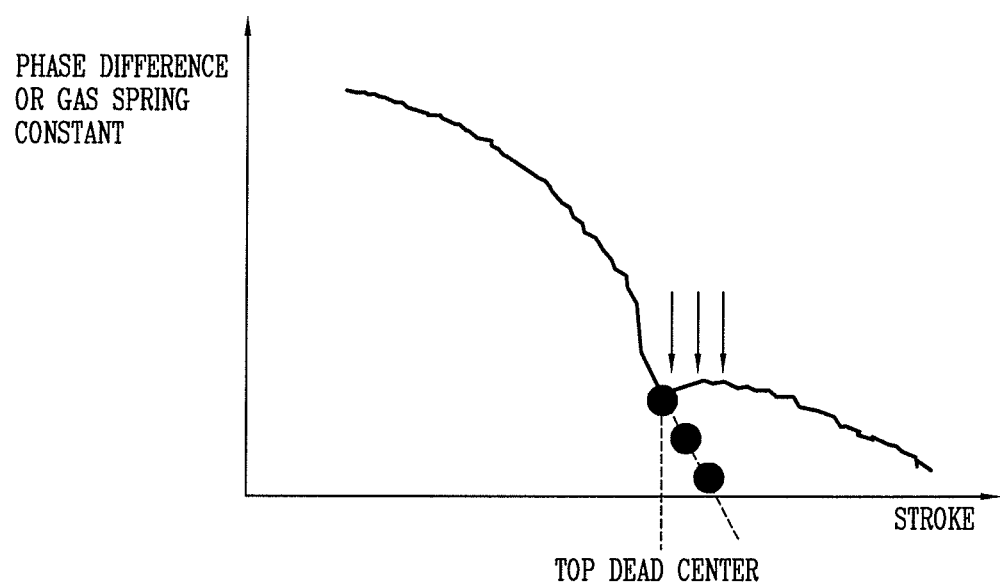
FIG. 16 is a graph illustrating a phase difference or gas spring constant detected at each predetermined period according to a change in a stroke according to an embodiment.

FIG. 16 is a graph illustrating a phase difference or gas spring constant detected at each predetermined period according to a change in a stroke according to an embodiment. First, the top dead center control method based on the phase difference will be described. The phase difference may refer to a phase difference between the asymmetric motor current Im_ASYM or the detected motor voltage Vm and the stroke.

When the phase difference and the stroke have a same phase, a change in the phase difference increases as the piston moves closer to a point at which the top dead center is '0.' That is, an inclination in the change in the phase difference sharply increases as the piston 241 moves closer to the top dead center of '0.'

In a case of driving the linear compressor having a resonant frequency, the phase difference increases again after the top dead center is detected. On the other hand, in a case of driving the linear compressor having a frequency higher than the resonant frequency, the change in the phase difference may not be predicted after the top dead center is detected.

However, as illustrated in FIG. 16, the controller 140 may detect the phase difference at every preset or predetermined period and detect a point at which the inclination is sharply changed. The controller 140 may set the detected phase difference as an initial reference phase difference, and then maintain the inclination on the initial reference phase difference at every preset or predetermined period. The preset or predetermined period may generally indicate a reciprocating period of the piston, but may be set or changed by a user, for example.

The controller 140 may compare the reference phase difference with a phase difference of a current period. When the reference phase difference is continuously reduced, a difference between the reference phase difference and a phase difference detected at every period after detection of the top dead center may be maintained over a predetermined value (number of times), regardless of unpredictable change in the phase difference after detection of the top dead center. When the difference is detected more than a predetermined number of times over the predetermined value, the controller 140 may determine the detected initial reference phase difference as a phase difference inflection point, and detect a position of the piston at the inflection point of the phase difference as a top dead center.

Accordingly, the controller 140 may output the control signal S_CON to the drive 110 using the detected top dead center. Therefore, the control apparatus 100 for a linear compressor according to an embodiment may detect the top dead center based on the phase difference between the asymmetric motor current Im_ASYM and the stroke according to the method discussed above, and control the linear compressor 200 based on the detected top dead center.

The top dead center control method based on the gas spring constant will be described hereinafter.

When the gas spring constant and the stroke have the same phase, a change in the gas spring constant increases as the piston 241 moves closer to a point at which the top dead center is '0.' That is, an inclination of the change in the gas spring constant sharply increases as the piston 241 moves closer to the top dead center of '0.'

In a case of driving the linear compressor having a resonant frequency, the gas spring constant increases again after the top dead center is detected. On the other hand, in a case of driving the linear compressor having a frequency higher than the resonant frequency, the change in the gas spring constant may not be predicted after the top dead center is detected.

However, as illustrated in FIG. 16, the controller 140 may detect the gas spring constant at every preset or predetermined period and detect a point at which the inclination is sharply changed. The controller 140 may set the detected gas spring constant as an initial reference constant, and then, may maintain the inclination on the initial reference constant at every preset or predetermined period. The preset or predetermined period may generally indicate a reciprocating period of the piston, but may be set or changed by a user, for example.

The controller 140 may compare the reference constant with a gas spring constant of a current period. When the reference constant is continuously reduced, a difference between the reference constant and a gas spring constant detected at every period after detection of the top dead center may be maintained over a predetermined value (number of times), regardless of the unpredictable change in the gas spring constant after the detection of the top dead center. When the difference is detected more than a predetermined number of times over the predetermined value, the controller 140 may detect the detected initial reference constant as an inflection point of the gas spring constant, and detect the position of the piston at the inflection point of the gas spring constant as a top dead center.

Accordingly, the controller 140 may output the control signal S_CON to the drive 110 using the detected top dead center. Therefore, the control apparatus 100 for a linear compressor according to an embodiment may detect the top dead center based on the gas spring constant according to the method discussed above, and control the linear compressor 200 based on the detected top dead center.

A calculation (computation) of the gas spring constant will be described hereinafter. In general, a piston which is linearly reciprocated by a linear motor may be provided with at least one spring to elastically support the piston in a motion direction of the piston.

A coil spring, which is a type of mechanical spring, may be installed on a hermetic container and a cylinder to elastically support the piston in the motion direction thereof. Gas, for example, a refrigerant, suctioned into a compression space may also serve as a gas spring.

The coil spring may have a predetermined mechanical spring constant Km, and the gas spring may have a gas spring constant Kgas, which may vary according to load. A specific frequency fn of the linear compressor may be decided based on the mechanical spring constant Km and the gas spring constant Kgas.

In accordance with an embodiment, the controller 140 may calculate the gas spring constant according to the load of the linear compressor. The controller 140 may calculate a gas spring constant Kgas, based on an asymmetric motor current Im_ASYM when a current offset i_offset is applied to a motor current Im detected by the detector 120, a stroke calculated based on the asymmetric motor current Im_ASYM and a detected motor voltage Vm, and a phase difference between the asymmetric motor current Im_ASYM and the stroke.

The gas spring constant Kgas may be calculated by the following Equation 2.

$$K_{gas} = \alpha \left| \frac{I(j\omega)}{X(j\omega)} \right| \cos(\theta_{i,x}) + M\omega^2 - K_m \quad \text{[Equation 2]}$$

where, α denotes a motor constant or a counter electromotive force constant, ω denotes an operating frequency, Km denotes a mechanical spring constant, Kgas denotes the gas spring constant, M denotes a mass of a piston, |I(jω)| denotes a current peak value for one period, and |X(jω)| denotes a stroke peak value for one period.

The controller 140 may set a gas spring constant, whose change is greatest among the gas spring constants, as an initial reference constant, and set a reference constant from the initial reference constant in response to repetition of the period. The reference constant may be reduced by a changed amount at the initial reference constant as the predetermined period is repeated.

Figure 17:
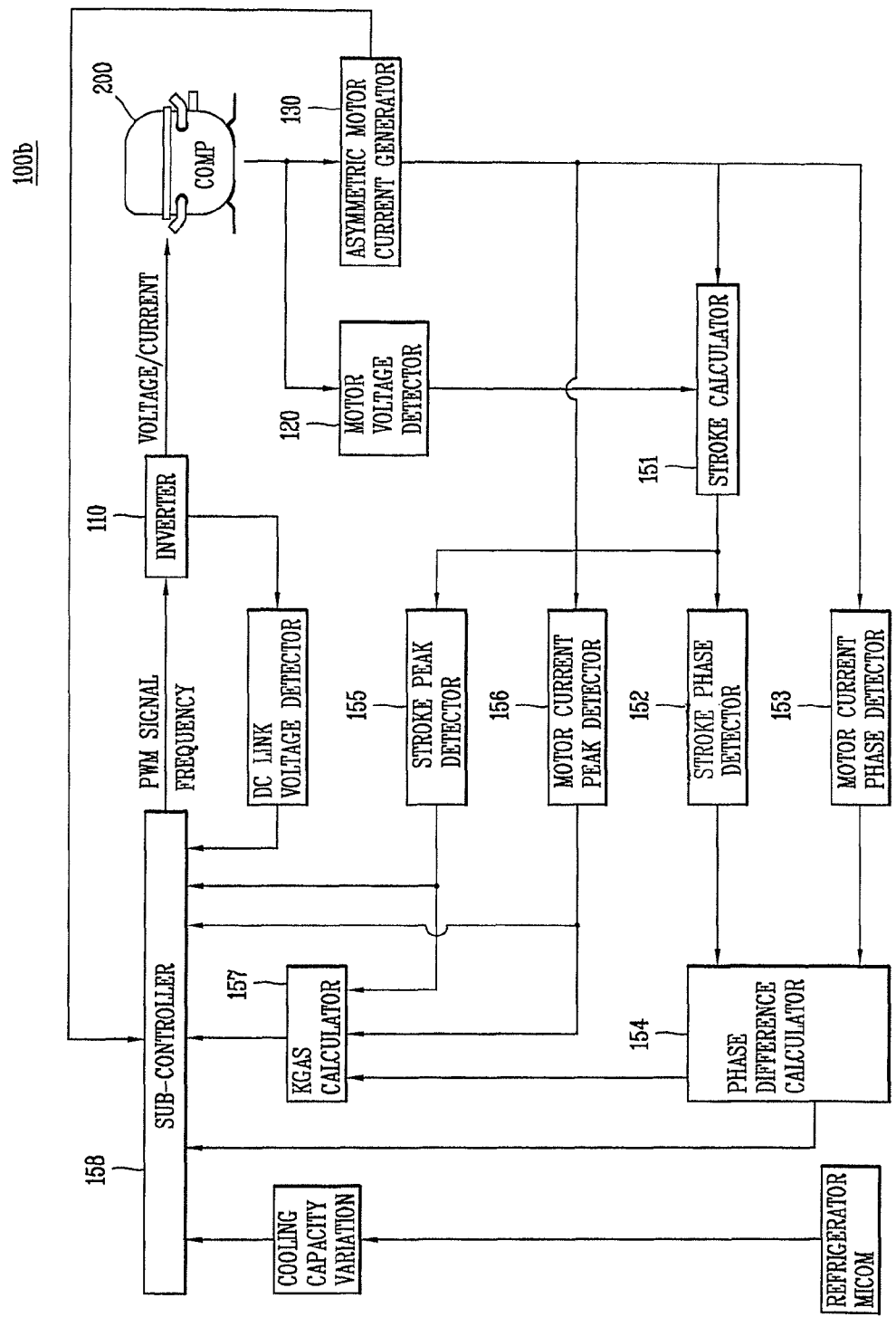
FIG. 17 is a block diagram of an apparatus for controlling a linear compressor in accordance with another embodiment.

FIG. 17 is a block diagram of an apparatus for controlling a linear compressor in accordance with another embodiment. The apparatus 100b for controlling a linear compressor illustrated in FIG. 17 is an apparatus configured based on a top dead center control or compressor power control method based on a phase difference and a gas spring constant. The apparatus 100b for controlling a linear compressor according to this embodiment may include a stroke calculating unit or calculator 151, a stroke phase detector 152, a motor current phase detector 153, a stroke peak detector 155, a motor current peak detector 156, a phase difference calculating unit or calculator 154, a gas spring constant calculating unit or calculator 157, and a sub controller 158. It is understood that implementing all of the illustrated components of the apparatus 100b for controlling a linear compressor illustrated in FIG. 17 is not a requirement, and that greater or fewer components may alternatively be implemented. Those components may be implemented as a type of controller as one component, or implemented by an on-chipped microcomputer (micom) and a microprocessor.

Hereinafter, each component will be described.

Motor voltage detector 120 may detect a motor current and/or a motor voltage of the linear compressor 200. The asymmetric motor current generator 130 may generate an asymmetric motor current by applying a current offset to the detected motor current.

The stroke calculator 151 may calculate a stroke based on the detected asymmetric motor current and the motor voltage. The stroke phase detector 152 may detect a phase of the calculated stroke. The motor current phase detector 153 may detect a phase of the detected asymmetric motor current.

The phase difference calculator 154 may calculate a difference between the phase of the calculated stroke and the phase of the detected asymmetric motor current, to detect a phase difference between the stroke and the asymmetric motor current. The stroke peak value detector 155 and the motor current peak value detector 156 may serve to detect a stroke peak value and an asymmetric motor current peak value, respectively, for detecting the gas spring constant.

The gas spring constant calculator 157 may serve to calculate the gas spring constant Kgas based on the phase difference, the stroke peak value, and the asymmetric motor current peak value. The gas spring constant calculator 157 may calculate the gas spring constant Kgas using the above-discussed Equation 2.

The sub-controller 158 may control the linear compressor COMP by controlling the drive 110, for example, an inverter, based on at least one of the phase difference or the gas spring constant. The sub-controller 158 may apply a PWM signal (a voltage control signal, S_CON), which may be modulated based on at least one of the phase difference or the gas spring constant, to the inverter 110. The sub-controller 158 may be a microcomputer (micom) and a microprocessor, independent of each other, for example. The sub-controller 158 may control a DC-DC converter (not illustrated) and the inverter based on a DC link voltage, which is a voltage of a DC link capacitor located between the DC-DC converter and the inverter.

In accordance with this embodiment, the sub-controller 158 may carry out a resonance operation based on a virtual capacitor when there is not a capacitor connected to the linear compressor 200. The sub-controller 158 may receive the asymmetric motor current from the asymmetric motor current generator 130, and perform a capacitor voltage calculating process for implementing the virtual capacitor.

The virtual capacitor will be described hereinafter.

The following embodiment may be implemented in part or as a combination of components or steps included in embodiments which have been discussed above or will be discussed hereinafter. For description of this embodiment, redundant parts will be understood accordingly, and description thereof has been omitted.

The apparatus for controlling a linear compressor according to this embodiment may include drive 110 to drive the linear compressor 200 based on a control signal, detector 120 to detect a motor current and/or a motor voltage of the linear compressor, asymmetric motor current generator 130 to generate an asymmetric motor current by applying a current offset to the detected motor current, and controller 140 to generate the control signal based on the asymmetric motor current and/or the detected motor voltage. The current offset may vary based on a change in a position of a piston. The current offset according to this embodiment may be decided based on a stroke asymmetry ratio based on an initial value of the piston.

Figure 10:
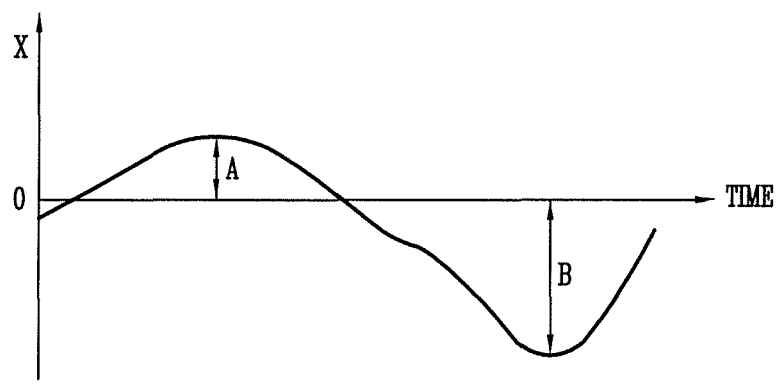
FIG. 10 is a graph illustrating one example of a movement amount (push(ed) amount) of a piston on a time basis according to an embodiment.

A graph illustrating a position or a variation of movement of the piston 242, which reciprocates in the cylinder 241, according to a lapse of time is shown in FIG. 10, for example. A stroke may be symmetric based on an initial value of the piston. However, when the motor current increases and the stroke increases according to a load of the compressor or a cooling capacity command value applied to the compressor, a push amount of the piston 242 may be increased due to gas condensation through the compression stroke of the piston 242. Also, when stiffness of a spring, which may be installed to elastically support the piston 242 in a motion direction of the piston 242, is reduced or the spring is removed, the push amount of the piston 242 may be increased.

Accordingly, as illustrated in FIG. 10, the stroke based on the initial value of the piston may be asymmetric. That is, a movement amount A of the piston toward a top dead center and a movement amount B of the piston toward a bottom dead center may be different from each other.

Therefore, the asymmetric current generator 130 may determine the current offset based on the stroke asymmetry ratio to increase a push amount of the piston 242, such that a maximum compression volume for the compressor is ensured to perform a maximum stroke operation, or such that the piston moving toward the bottom dead center cannot move over a stroke peak or mechanical limit.

In accordance with an embodiment, in a case of controlling a compressor by a stroke control method or a top dead center control method in order to ensure the cooling capacity of the compressor, the current offset may be varied such that the initial value of the piston may move toward the bottom dead center when a stroke asymmetry ratio calculated by the asymmetric current generator 130 or the controller 140 is smaller than a preset or predetermined target asymmetry ratio. Accordingly, when the asymmetric current generator 130 includes an adder, a size (magnitude) of a positive current offset i_offset may be reduced, a size of a negative current offset i_offset may be increased, or a sign of the current offset i_offset may be changed into a negative (minus) sign. When the asymmetric current generator 130 includes a subtractor, the size of the negative current offset i_offset may be reduced, the size of the positive current offset i_offset may be increased, or the sign of the current offset i_offset may be changed into a positive sign.

In order to prevent an impact from being applied to the piston 242, in a case of controlling the compressor by the stroke control method or the top dead center control method, the current offset may be varied such that the initial value of the piston may move toward the top dead center when the stroke asymmetry ratio calculated by the asymmetric current generator 130 or the controller 140 is greater than the preset or predetermined target asymmetry ratio. Accordingly, when the asymmetric current generator 130 includes the adder, the size of the positive current offset i_offset may be increased, the size of the negative current offset i_offset may be reduced, or the sign of the current offset i_offset may be changed into the positive sign. When the asymmetric current generator 130 has the subtractor, the size of the negative current offset i_offset may be increased, the size of the positive current offset i_offset may be reduced, or the sign of the current offset i_offset may be changed into the negative sign.

Description thereof will be given with reference to the related drawings. As illustrated in FIG. 15C, first, the asymmetric current generator 130 or the controller 140 may calculate a stroke asymmetry ratio, and compare the calculated stroke asymmetry ratio with a preset or predetermined target asymmetry ratio (S131). When the calculated stroke asymmetry ratio is smaller than the preset or predetermined target asymmetry ratio, the current offset may be varied such that the initial value of the piston may move toward the bottom dead center (S133). Also, in order to prevent an impact from being applied to the piston 242, in a case of controlling the compressor by the stroke control method or the top dead center control method, the current offset may be varied such that the initial value of the piston may move toward the top dead center when the stroke asymmetry ratio calculated by the asymmetric current generator 130 or the controller 140 is greater than the preset or predetermined target asymmetry ratio (S132).

As one exemplary calculation of the asymmetry ratio of the stroke, the asymmetry ratio of the stroke may be calculated based on a value obtained by dividing the movement amount A (or movement amount B) by the movement amount B (or movement amount A), or based on a crest factor, which may be obtained by dividing a maximum value of a stroke waveform by an effective value rms. However, embodiments are not be limited to this, and the asymmetry ratio of the stroke may also be calculated by other various well-known methods.

Figure 11:
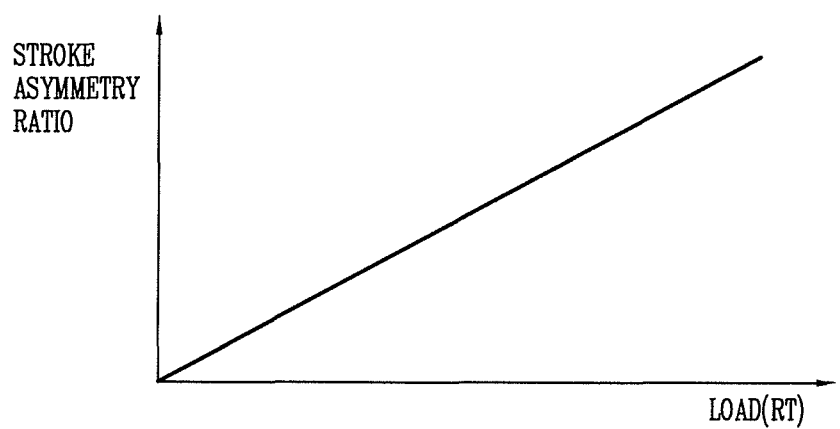
FIG. 11 is a graph illustrating a relationship between a load of a compressor and a stroke asymmetry ratio according to an embodiment.

The asymmetry ratio of the stroke, as illustrated in FIG. 11, tends to increase in response to an increase in a load of the compressor or a cooling capacity command value applied to the compressor. Therefore, even though the asymmetry ratio of the stroke is not calculated directly by the aforementioned method, it may be indirectly calculated using the load of the compressor or the cooling capacity command value applied to the compressor. Therefore, the asymmetric current generator 130 or the controller 140 may vary the current offset based on the load of the compressor or the cooling capacity command value applied to the compressor.

A current offset according to another embodiment may be determined based on a comparison result between a motor current and a preset or predetermined motor current peak value. The motor current detected by the detector 120 may be compared with the preset or predetermined motor current peak value. When the detected motor current is greater than the preset or predetermined motor current peak value, the current offset may be varied such that the initial value of the piston may move toward a top dead center. Accordingly, when the asymmetric current generator 130 includes an adder, a size of a positive current offset i_offset may be increased, a size of a negative current offset i_offset may be reduced, or a sign of the current offset i_offset may be changed into a positive (plus) sign. When the asymmetric current generator 130 includes a subtractor, the size of the negative current offset i_offset may be increased, the size of the positive current offset i_offset may be reduced, or the sign of the current offset i_offset may be changed into a negative (minus) sign.

When the detected motor current is smaller than the preset or predetermined motor current peak value, the current offset may be varied such that the initial value of the piston may move toward a bottom dead center. Accordingly, when the asymmetric current generator 130 includes the adder, the size of a positive current offset i_offset may be reduced, the size of the negative current offset i_offset may be increased, or the sign of the current offset i_offset may be changed into the negative (minus) sign. When the asymmetric current generator 130 includes the subtractor, the size of the negative current offset i_offset may be reduced, the size of the positive current offset i_offset may be increased, or the sign of the current offset i_offset may be changed into the positive (plus) sign.

A value which is obtained by subtracting a preset or predetermined current-changed amount (or a current variation) from the preset or predetermined motor current peak value may be compared with the detected motor current. Accordingly, when the detected motor current is smaller than the value obtained by subtracting the preset or predetermined current-changed amount from the preset or predetermined motor current peak value, as aforementioned, the current offset may be varied such that the initial value of the piston can move toward the bottom dead center. On the other hand, when the detected motor current is greater than the value obtained by subtracting the preset or predetermined current-changed amount from the preset or predetermined motor current peak value, as aforementioned, the current offset may not be varied and the current offset may be maintained as it is.

In this manner, by changing the current offset using the motor current detected by the asymmetric current generator 130 or the controller 140, a maximum compression volume for the compressor may be ensured so as to perform a maximum stroke operation, while preventing the piston from exceeding the stroke peak or mechanical limit. This operation will be described with reference to the drawings.

Figure 15A:
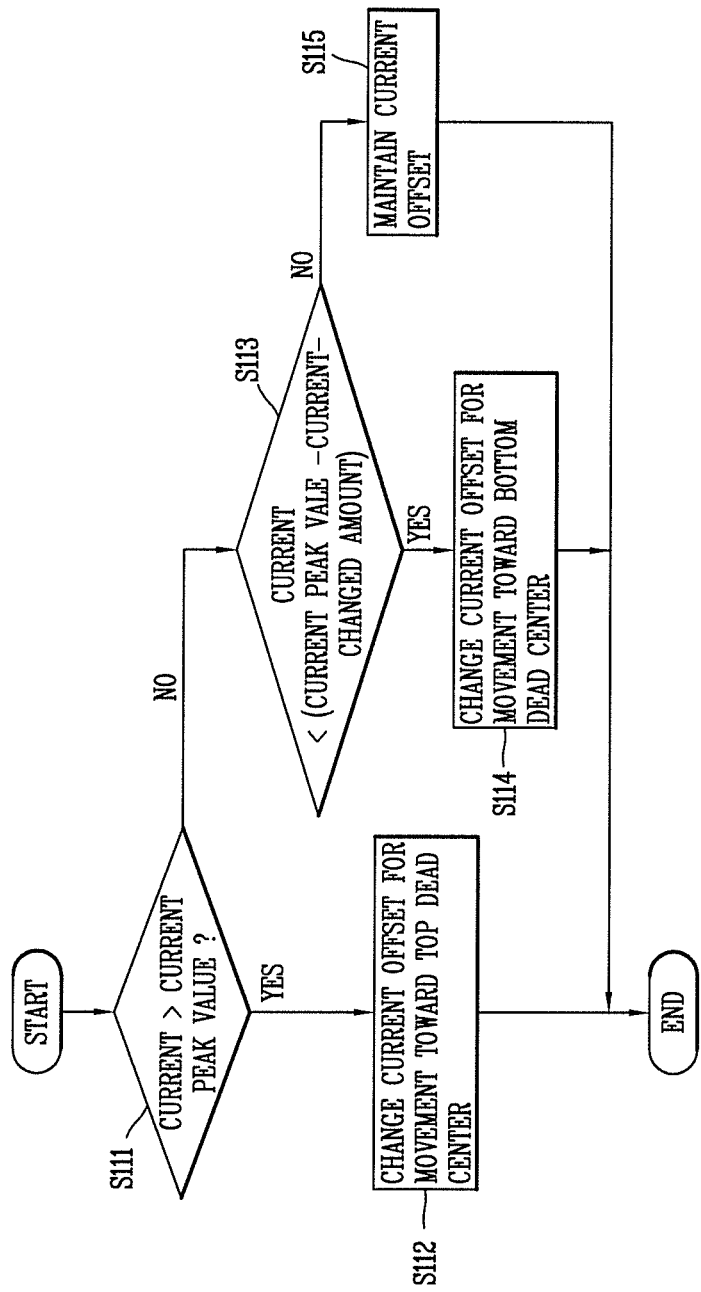
FIGS. 15A to 15D are flowcharts illustrating a counter-asymmetric control method in accordance with an embodiment.

As illustrated in FIG. 15A, the detector 120 may detect a motor current and the asymmetric current generator 130 or the controller 140 may compare the detected motor current with a preset or predetermined motor current peak value (S111). When the detected motor current is greater than the preset or predetermined motor current peak value, the current offset may be varied such that the initial value of the piston may move toward a top dead center (S112). On the other hand, when the detected motor current is smaller than the preset or predetermined motor current peak value, the asymmetric current generator 130 or the controller 140 may compare the detected motor current with the value, which may be obtained by subtracting the preset or predetermined current-changed amount from the preset or predetermined motor current peak value (S113).

When the detected motor current is smaller than the value obtained by subtracting the preset or predetermined current-changed amount from the preset or predetermined motor current peak value, the current offset may be varied such that the initial value of the piston may move toward the bottom dead center (S114). On the other hand, when the detected motor current is greater than the value obtained by subtracting the preset or predetermined current-changed amount from the preset or predetermined motor current peak value, as aforementioned, the current offset may be maintained as it is without change (S115).

The current offset in accordance with another embodiment may also be determined based on a comparison result between a detected stroke and a preset or predetermined stroke peak value. A stroke calculated by the controller 140 according to an equation such as Equation 1 may be compared with the preset or predetermined stroke peak value. When the calculated stroke is greater than the preset or predetermined stroke peak value, the current offset may be varied such that the initial value of the piston may move toward a top dead center. Accordingly, when the asymmetric current generator 130 includes an adder, a size of a positive current offset i_offset may be increased, a size of a negative current offset i_offset may be reduced, or a sign of the current offset i_offset may be changed into a positive (plus) sign. When the asymmetric current generator 130 includes a subtractor, the size of the negative current offset i_offset may be increased, the size of the positive current offset i_offset may be reduced, or the sign of the current offset i_offset may be changed into a negative (minus) sign.

When the detected stroke is smaller than the preset or predetermined stroke peak value, the current offset may be varied such that the initial value of the piston may move toward the bottom dead center. Accordingly, when the asymmetric current generator 130 includes the adder, the size of the positive current offset i_offset may be reduced, the size of the negative current offset i_offset may be increased, or a sign of the current offset i_offset may be changed into the negative (minus) sign. When the asymmetric current generator 130 includes the subtractor, the size of the negative current offset i_offset may be reduced, the size of the positive current offset i_offset may be increased, or the sign of the current offset i_offset may be changed into the positive (plus) sign.

A value, which may be obtained by subtracting a preset or predetermined stroke-changed amount from the preset or predetermined stroke peak value may be compared with the detected stroke. Accordingly, when the detected stroke is smaller than the value obtained by subtracting the preset or predetermined stroke-changed amount from the preset or predetermined stroke peak value, as discussed above, the current offset may be varied such that the initial value of the piston may move toward a bottom dead center. On the other hand, when the detected stroke is greater than the value obtained by subtracting the preset or predetermined stroke-changed amount from the preset or predetermined stroke peak value, as aforementioned, the current offset may be maintained as it is without change. In this manner, by changing the current offset using the stroke detected by the asymmetric current generator 130 or the controller 140, a maximum compression volume for the compressor may be ensured so as to perform a maximum stroke operation, while preventing the piston from exceeding the stroke peak or mechanical limit.

Figure 15B:
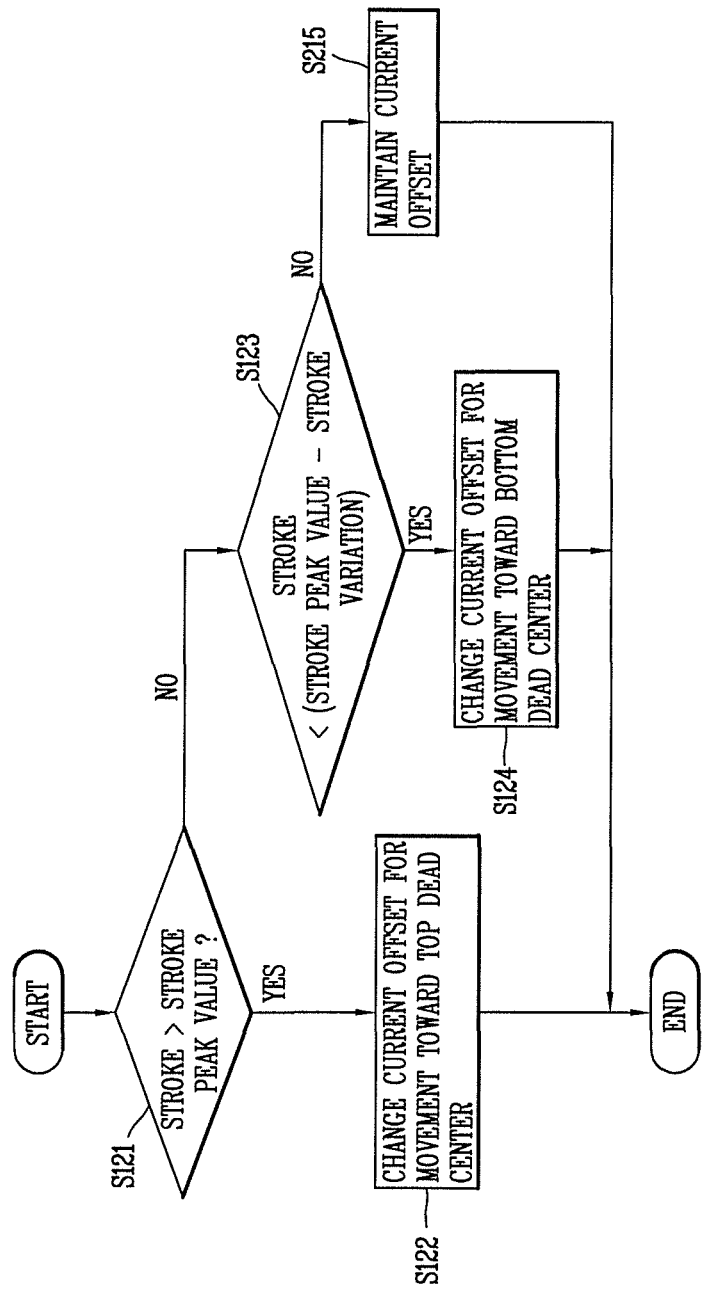
Figure 15C:
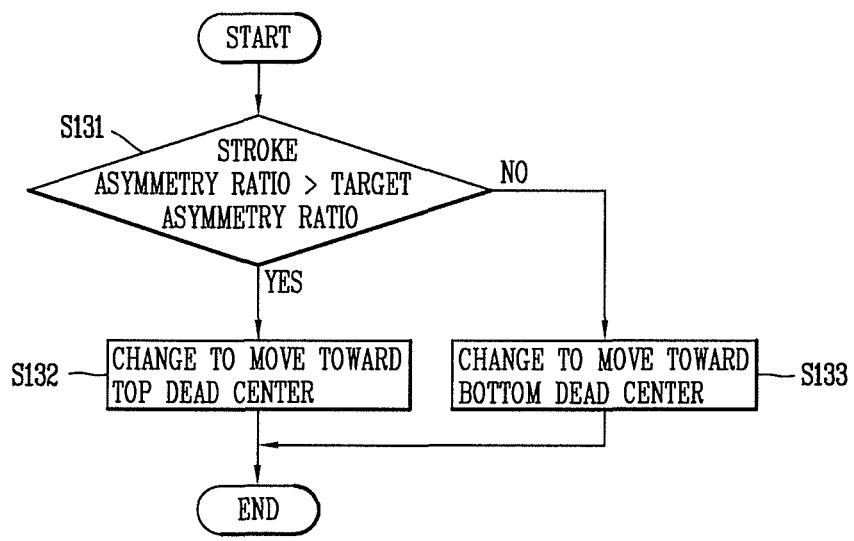

This operation will be described with reference to the drawings. As illustrated in FIG. 15B, first, the controller 140 may calculate a stroke according to an equation such as Equation 1, and the asymmetric current generator 130 or the controller 140 may compare the calculated stroke with a preset or predetermined stroke peak value (S121). When the calculated stroke is greater than the preset or predetermined stroke peak value, the current offset may be varied such that the initial value of the piston may move toward a top dead center (S122).

On the other hand, when the detected stroke is smaller than the preset or predetermined stroke peak value, the asymmetric current generator 130 or the controller 140 may compare the calculated stroke with a value, which may be obtained by subtracting a preset or predetermined stroke-changed amount from the preset or predetermined stroke peak value (S123). When the calculated stroke is smaller than the value obtained by subtracting the preset or predetermined stroke-changed from the preset or predetermined stroke peak value, the current offset may be varied such that the initial value of the piston may move toward the bottom dead center (S124). On the other hand, when the calculated stroke is greater than the value obtained by subtracting the preset or predetermined stroke-changed amount from the preset or predetermined stroke peak value, as discussed above, the current offset may be maintained as it is (S125).

The current offset in accordance with another embodiment may also be determined based on a detected top dead center. The controller 140 may detect a phase difference between a phase of the asymmetric motor current Im_ASYM and a phase of the detected stroke, and detect a top dead center of the linear compressor based on the phase difference. The asymmetric current generator 130 may then vary a current offset such that the detected top dead center can be '0.'

For example, when the detected top dead center is greater than '0,' the current offset may be varied such that the initial value of the piston may move toward the top dead center. Accordingly, when the asymmetric current generator 130 includes an adder, a size of a positive current offset i_offset may be increased, a size of a negative current offset i_offset may be reduced, or a sign of the current offset i_offset may be changed into a positive (plus) sign. When the asymmetric current generator 130 includes a subtractor, the size of the negative current offset i_offset may be increased, the size of the positive current offset i_offset may be reduced, or the sign of the current offset i_offset may be changed into a negative (minus) sign.

When the detected top dead center is smaller '0,' the current offset may be varied such that the initial value of the piston may be moved toward a bottom dead center. Accordingly, when the asymmetric current generator 130 includes the adder, a size of a positive current offset i_offset may be reduced, a size of a negative current offset i_offset may be increased, or a sign of the current offset i_offset may be changed into the negative (minus) sign. When the asymmetric current generator 130 includes the subtractor, the size of the negative current offset i_offset may be reduced, the size of the positive current offset i_offset may be increased, or the sign of the current offset i_offset may be changed into the positive (plus) sign.

In this manner, by changing the current offset using the top dead center detected by the asymmetric current generator 130 or the controller 140, a maximum compression volume for the compressor may be ensured so as to perform a maximum stroke operation, while preventing the piston from exceeding the stroke limit or mechanical limit. Simultaneously, when the spring that elastically supports the piston has low stiffness or is not present, the piston may be prevented from applying an impact to an end of the cylinder in a direction of a discharge valve.

Figure 15D:
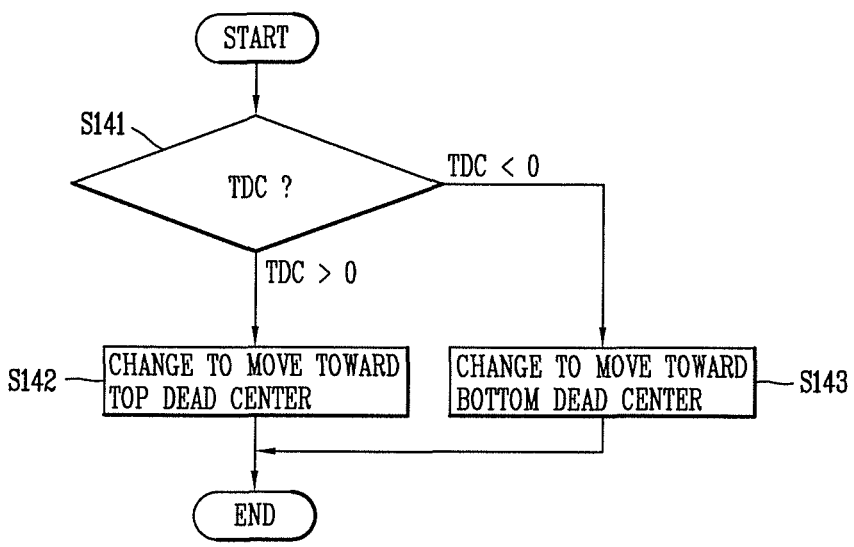

This operation will be described with reference to the drawings. As illustrated in FIG. 15D, first, the controller 140 may detect a phase difference between a phase of the asymmetric current motor Im_ASYM and a phase of the detected stroke, and detect a top dead center of the linear compressor based on the phase difference (S141). The asymmetric current generator 130 may then vary the current offset such that the detected top dead center may be '0'. When the calculated top dead center is greater than '0,' the current offset may be varied (changed) such that the initial value of the piston, may move toward the top dead center (S142). When the calculated top dead center is smaller than '0,' the current offset may be varied such that the initial value of the piston may move toward a bottom dead center (S143).

Figure 14:
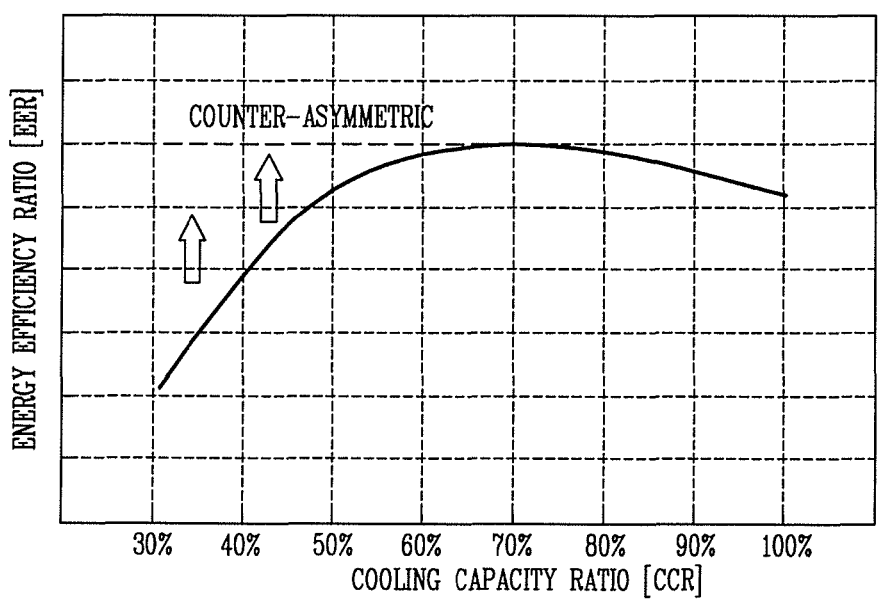
FIG. 14 is a graph illustrating efficiency of a compressor by a counter-asymmetric control according to a cooling capacity, in accordance with an embodiment.

As illustrated in FIG. 14, efficiency of the compressor by the counter-asymmetric control according to an embodiment may be indicated according to a cooling capacity. In FIG. 14, a horizontal axis (X axis) of the graph, which indicates a cooling capacity, may be a cooling capacity ratio (CCR), and a vertical axis (Y axis), which indicates efficiency of the compressor, may be an energy efficiency ratio (EER).

Figure 13:
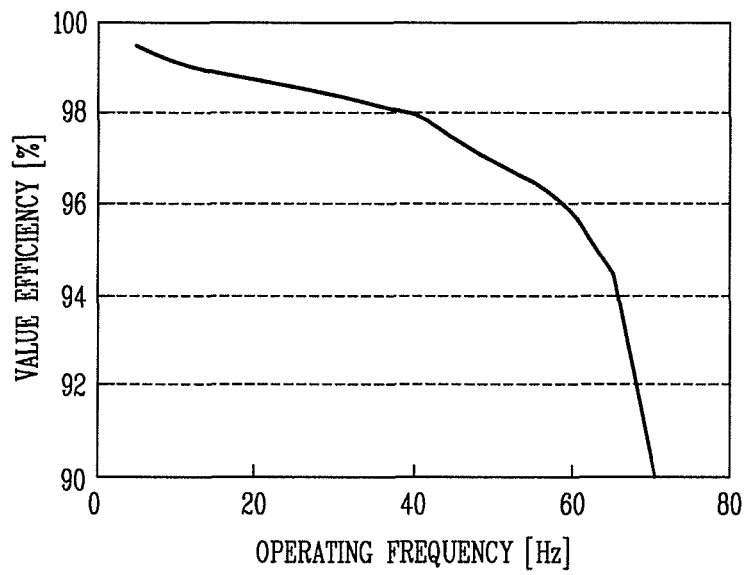
FIG. 13 is a graph illustrating valve efficiency according to an operating frequency according to an embodiment.

It can be noticed that the compressor efficiency by the counter-asymmetric control has been improved, specifically, the compressor efficiency has been improved in a low/intermediate cooling capacity zone of 30% to 60% of CCR. Such effects may be predicted from valve efficiency according to an operating frequency illustrated in FIG. 13. As illustrated in FIG. 13, a high valve efficiency is exhibited at a low operating frequency. Hence, for improving the valve efficiency, a low frequency operation is required. The low frequency operation may be enabled using a spring with low stiffness as the spring elastically supports the piston.

Therefore, the controller 140 according to an embodiment may perform a counter-asymmetric control to allow the piston of the compressor using the spring with the low stiffness to perform a maximum stroke operation, without a collision in a direction toward the bottom dead center due to exceeding a mechanical limit, which may result in ensuring an optimal cooling capacity and also improving compressor efficiency.

The following embodiment may be implemented in part or as a combination of components or steps included in embodiments which have been discussed above or will be discussed hereinafter. For description of this embodiment, redundant parts will be understood accordingly, and description thereof has been omitted.

In accordance with this embodiment, a current offset applied to a motor current by the asymmetric motor current generator 130 may be varied according to an operation mode of the linear compressor. The operation mode may be at least one of a symmetric control mode, an asymmetric control mode, or a counter-asymmetric control mode. For example, the symmetric control mode may be a mode for increasing efficiency, and may be referred to as a "high efficiency mode". Also, the symmetric control mode may be a mode for performing a relatively lower load or cooling capacity operation than the asymmetric control mode, and may thusly be referred to as a "low load or cooling capacity mode".

The asymmetric control mode may be a mode for increasing an output, and may be referred to as a "high output mode". Also, the asymmetric control mode may be a mode for performing a relatively higher load or cooling capacity operation than the symmetric control mode, and may thusly be referred to as a "high load or cooling capacity mode".

The counter-asymmetric control mode may be a mode for ensuring an optimal cooling capacity for a maximum stroke operation, in order to prevent an impact of the piston or compressor. The counter-asymmetric control mode may be also a mode for performing a higher load or cooling capacity operation than the symmetric control mode. However, the counter-asymmetric control mode may allow for performing a maximum stroke operation without an impact by the piston during a higher load or cooling capacity operation than the asymmetric control mode, and may thus be referred to as an "overload or over-cooling capacity mode".

Figure 12:
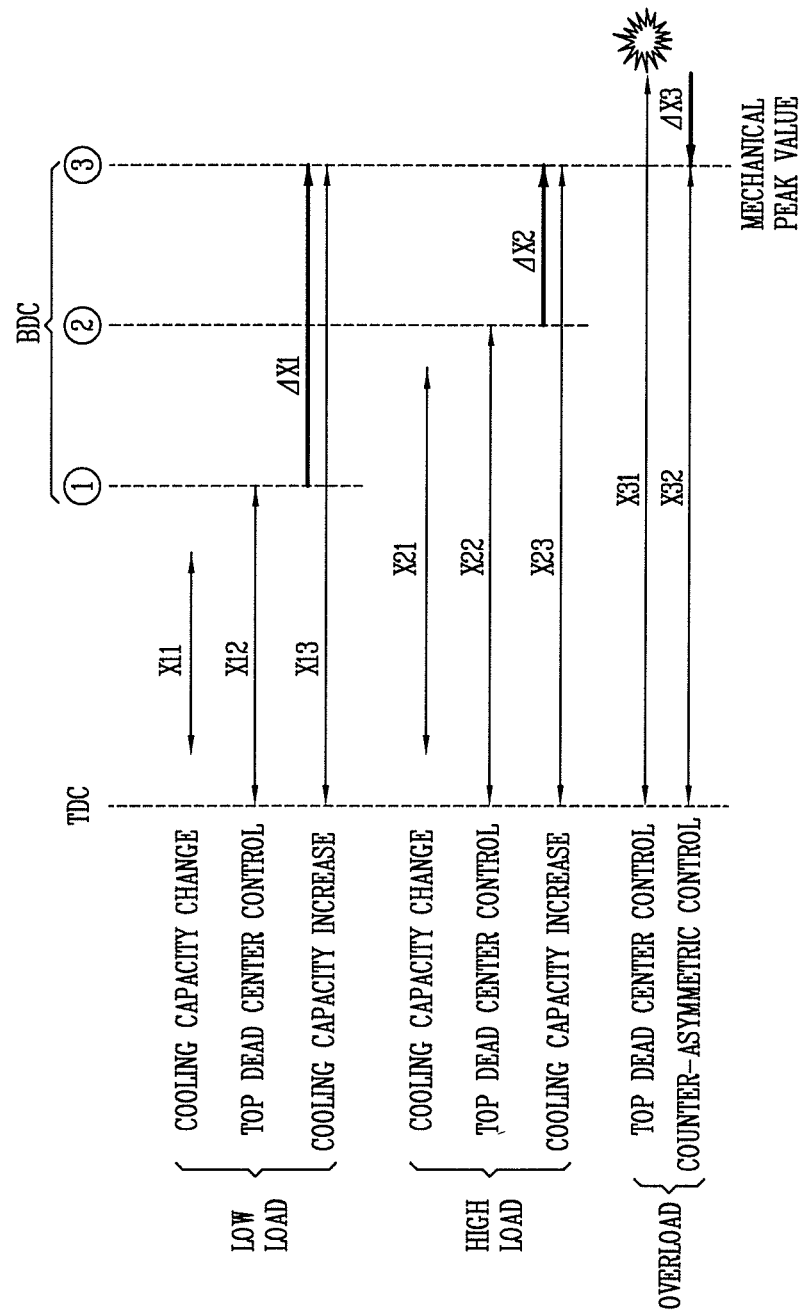
FIG. 12 is a view illustrating a stroke for each operation mode according to a size of a load of a compressor, in accordance with an embodiment.

A stroke for each operation mode according to a size of a compressor load may be schematized as illustrated in FIG. 12.

FIG. 12 is a view illustrating a stroke for each operation mode according to a size of a compressor load, in accordance with an embodiment. When a compressor load is low or a cooling capacity command value is low, the controller 140 may control the compressor to operate in the symmetric control mode according to a stroke control method. In this instance, as illustrated in FIG. 12, the controller 140 may vary the cooling capacity by changing a stroke within a range X11. The range X11 may indicate or correspond to a position of the piston upon a suction stroke from a position of the piston upon a compression stroke, and may correspond to a point at which a top dead center exceeds '0' to a point below a first bottom dead center ①.

When the compressor load is low or the cooling capacity command value is low, the controller 140 may control the compressor to operate in the symmetric control mode according to a top dead center control method. In this instance, as illustrated in FIG. 12, a stroke may be carried out within a range X12. The range X12 may indicate or correspond to a position of the piston upon the suction stroke from a position of the piston upon the compression stroke, and may correspond from a point at which the top dead center is '0' to the first bottom dead center ①. A stroke distance X12 of the piston by the top dead center control method is longer than X11. Therefore, at the low load or low cooling capacity, the compressor operating in the symmetric control mode may perform a maximum stroke operation.

When the compressor load is low or the cooling capacity command value is low, the controller 140 may control the compressor to operate in the asymmetric control mode to perform the maximum stroke operation. In this instance, as illustrated in FIG. 12, the stroke may be carried out within a range X13. The range X13 may be a range extending by ΔX1 from the range X12, and may correspond from the point at which the top dead center is '0' to a third bottom dead center ③. Accordingly, an output cooling capacity may be increased more than an output cooling capacity of the compressor operating in the symmetric control mode.

On the other hand, when the compressor load is high or the cooling capacity command value is high, the controller 140 may control the compressor to operate in the symmetric control mode according to the stroke control method. The controller 140 may increase the stroke in order to extend an output of the compressor according to the compressor load or the cooling capacity command value. That is, as illustrated in FIG. 12, during the suction stroke, the position of the piston may further be moved over the first bottom dead center ① to change the stroke within a range X21, thereby changing the cooling capacity. The range X21 may indicate or correspond to a position of the piston upon the suction stroke from the position of the piston upon the compression stroke, and may correspond from a point where the top dead center exceeds '0' to a point below a second bottom dead center ②.

When the compressor load is high or the cooling capacity command value is high, the controller 140 may control the compressor to operate in the symmetric control mode according to the stroke control method. In this instance, as illustrated in FIG. 12, the stroke may be carried out within a range of X22. The range X22 may indicate or correspond to a position of the piston upon the suction stroke from the position of the piston upon the compression stroke, and may correspond from a point at which the top dead center is '0' to a second bottom dead center ②. A stroke distance X22 of the piston by the top dead center control method is longer than X21. Therefore, at the high load or high cooling capacity, the compressor operating in the symmetric control mode may perform a maximum stroke operation.

Also, when the compressor load is high or the cooling capacity command value is high, the controller 140 may control the compressor to operate in the asymmetric control mode to perform a maximum stroke operation. In this instance, as illustrated in FIG. 12, the stroke may be carried out within a range X23. The range X23 may be a range extending by ΔX2 from the range X22, and may correspond from the point at which the top dead center is '0' to the third bottom dead center ③. Accordingly, the output cooling capacity can be increased more than that in the compressor operating in the symmetric control mode.

On the other hand, when the compressor load is an overload or the cooling capacity command value is an over cooling capacity, the controller 140 may control the compressor to operate in the symmetric control mode or the asymmetric control mode according to the top dead center control method. However, when the spring that elastically supports the piston has low stiffness or is not present, the piston may exceed the third bottom dead center ③ during the suction stroke, thereby being likely to cause an impact. The third bottom dead center ③ may be a mechanical limit or stroke peak that the piston is movable within the cylinder.

Therefore, in order to carry out the stroke within the range X31 without the impact of the piston, the controller 140 may control the compressor to operate in the counter-asymmetric control mode. That is, the controller 140 may control the stroke distance to be reduced by a distance ΔX3 that the piston is movable by an amount exceeding the mechanical peak value.

Switching among the symmetric control mode, the asymmetric control mode, and the counter-asymmetric control mode may not be limited by which control mode is used in a previous operation mode. However, an operation right before the asymmetric control mode or the counter-asymmetric control mode may be the counter-asymmetric control mode or the asymmetric control mode, in order to perform the maximum stroke operation by ensuring a maximum compression volume and to determine a bottom dead center at which the piston does not exceed the stroke peak or mechanical limit.

For example, the compressor in accordance with one embodiment may normally operate in the symmetric control mode. When the load is increased or the cooling capacity command value requires a high cooling capacity, the compressor may operate in the asymmetric control mode or the counter-asymmetric control mode. However, when the spring that elastically supports the piston has a low stiffness or is not present, the compressor may first operate in the counter-asymmetric control mode to prevent a collision caused due to the piston exceeding the stroke peak, and then perform the maximum stroke operation in the asymmetric control mode for increasing the stroke toward the bottom dead center in an operating state according to the top dead center control method.

The operation mode of the compressor, as discussed above, may be determined based on the load of the compressor or the cooling capacity command value applied to the compressor. More specifically, among the operation modes, the asymmetric control mode and the counter-asymmetric control mode may be determined based on at least one of an asymmetry ratio of a stroke based on an initial value of the piston, a comparison result between a motor current and a preset or predetermined motor current peak value, a comparison result between a detected stroke and a preset or predetermined stroke peak value, or a detected top dead center, in addition to the load of the compressor or the cooling capacity command value applied to the compressor.

The controller 140 may set the current offset as '0' when the operation mode is the symmetric control mode, and set the current offset as a value other than '0' when the operation mode is the asymmetric control mode or the counter-asymmetric control mode. The current offset in the asymmetric control mode and the current offset in the counter-asymmetric control mode may have opposite signs to each other.

A value of the current offset may be set or determined based on at least one of a load of the linear compressor, a cooling capacity command value applied to the linear compressor, an asymmetry ratio of a stroke based on an initial value of the piston, a comparison result between a motor current and a preset or predetermined motor current peak value, a comparison result between a detected stroke and a preset or predetermined stroke peak value, or a detected top dead center, or set by adding or subtracting a unit current offset of a predetermined size. The load of the linear compressor may be detected based on at least one of an absolute value of a phase difference between a current applied to the linear compressor and a stroke, an outer temperature of the linear compressor, an inner temperature of the linear compressor, or a temperature of a condenser and an evaporator within a refrigeration cycle. The cooling capacity command value may be generated by a main controller of a refrigerator or the load of the compressor.

Figure 18:
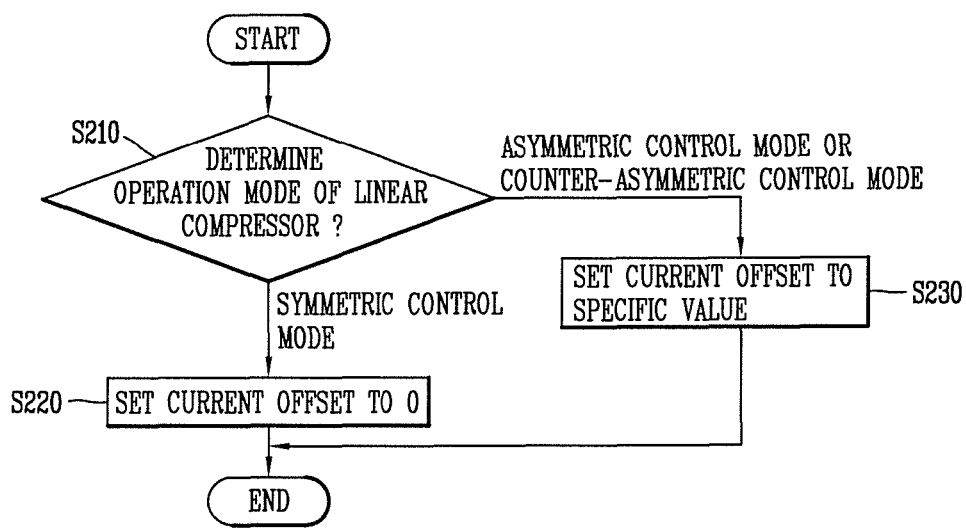
FIG. 18 is a flowchart of a method of setting a current offset based on an operation mode, in accordance with an embodiment.

FIG. 18 is a flowchart of a method of setting a current offset based on an operation mode, in accordance with an embodiment. As illustrated in FIG. 18, the controller 140 may determine an operation mode of the linear compressor 200 (S210).

The controller 140 may set a current offset i_offset to '0' when the operation mode is a symmetric control mode (S220). The controller 140 may set the current offset i_offset to a predetermined value other than '0' when the operation mode is the asymmetric control mode or the counter-asymmetric control mode (S230).

The predetermined value other than '0' may be set based on at least one of a load of the linear compressor, a cooling capacity command value applied to the linear compressor, an asymmetry ratio of a stroke based on an initial value of the piston, a comparison result between a motor current and a preset or predetermined motor current peak value, a comparison result between a detected stroke and a preset or predetermined stroke peak value, or a detected top dead center, or set by adding or subtracting a unit current offset of a predetermined size. The operation mode may be set in various manners by the controller 140 or the main controller (micom) of the refrigerator. As discussed above, the operation mode may be set based on at least one of the load of the compressor, the cooling capacity command value applied to the compressor, the asymmetry ratio of the stroke based on the initial value of the piston, the comparison result between the motor current and the preset or predetermined motor current peak value, the comparison result between the detected stroke and the preset or predetermined stroke peak value, or the detected top dead center.

For example, the controller 140 or the main controller of the refrigerator may set the operation mode to the symmetric control mode when the load of the compressor is smaller than a first reference load or a first reference cooling capacity command value, for example, 150 watts, and set the operation mode to the asymmetric control mode or the counter-asymmetric control mode when the load of the compressor is greater than the first reference load or the first reference cooling capacity command value, for example, 150 watts. The current offset i_offset may be set by the controller 140, and the asymmetric current generator 130 may generate an asymmetric motor current based on the current offset.

On the other hand, the current offset i_offset may be set by the asymmetric current generator 130, and then the asymmetric current generator 130 may generate the asymmetric motor current. For example, when the controller 140 transfers the detected load value to the asymmetric current generator 130, the asymmetric current generator 130 may determine or set a current offset i_offset corresponding to the detected load using a table, in which a current offset set value according to a load may be stored.

The apparatus 100 for controlling a linear compressor according to an embodiment may calculate a current offset i_offset based on a motor constant (or a counter electromotive force constant) α.

Also, a piston push amount $Push_{i_{offset}}[mm]$ by the current offset i_offset may be expressed by the following Equation 3.

$$Push_{i_{offset}} = \frac{\alpha \times I_{offset}}{K_{spring}} \qquad [\text{Equation 3}]$$

where α[N/ADC] denotes a motor constant or a counter electromotive force constant, $I_{offset}$[ADC] denotes a current offset, and $K_{spring}$[N/mm] denotes a spring constant.

That is, the push amount of the piston, as expressed in Equation 3, may be proportional to a motor constant corresponding to a motor of the compressor and the current offset, and inversely proportional to a spring constant of a spring installed to elastically support the piston in a motion direction. Therefore, in order to enhance accuracy of an asymmetric motor control, when a desired push amount is determined, the controller 140 may estimate the motor constant α in response to driving the compressor so as to determine a more accurate current offset i_offset.

The motor constant α may be determined based on the stroke and the motor current Im or the asymmetric motor current Im_ASYM. Therefore, the controller 140 may set the current offset i_offset by detecting or estimating the motor constant α based on the stroke and the motor current Im or the asymmetric motor current Im_ASYM.

The current offset for accurately controlling the piston push amount may be set through the estimation or detection of the motor constant, which may enable accurate asymmetric motor control.

The following embodiment may be implemented in part or as combination of components or steps included in embodiments which have been discussed above or will be discussed hereinafter. For description of this embodiment, redundant parts will be understood accordingly, and description thereof has been omitted.

This embodiment illustrates a compressor control apparatus with a virtual capacitor, capable of executing an asymmetric motor control, and a control method thereof. The apparatus for controlling a linear compressor according to this embodiment may include a resonance compressor, which carries out a resonance operation based on an inductor corresponding to a motor and a virtual capacitor.

The controller 140 according to this embodiment may integrate an asymmetric motor current, calculate a capacitor voltage by multiplying the integrated value by a specific constant value, and implement or execute a function of the virtual capacitor by generating the control signal based on the calculated capacitor voltage. The control signal generated by the controller 140 may be a voltage control signal generated by a pulse width modulation (PWM). The controller 140 may generate the voltage control signal based on the calculated capacitor voltage.

The controller 140 may generate a changed PWM reference signal by subtracting the calculated capacitor voltage from a PWM reference signal of a sine wave type for adjusting a pulse width of the voltage control signal, and generate the voltage control signal based on the changed PWM reference signal. A capacitance of the virtual capacitor may be inversely proportional to the specific constant value. The virtual capacitor modulation according to this embodiment may refer to implementing in a software manner a physically existing capacitor voltage within a micom, a controller, or the controller 140.

For example, as illustrated in FIG. 17, the sub-controller 158 may implement a function of the virtual capacitor, which may implement a real capacitor in a software configuration, based on the asymmetric motor current Im_ASYM. Therefore, a motor control by the virtual capacitor may be carried out in order to provide a same control function as an existing capacitor in the absence of a physical capacitor.

In general, a linear compressor may be a resonance compressor, which may execute a resonance operation based on an inductor corresponding to a motor and a capacitor (AC capacitor) connected to the motor. However, according to this embodiment, by removing a real capacitor (AC capacitor) connected to the motor, the controller 140 may then implement a capacitor corresponding to the physical capacitor in a software configuration.

Figure 19:
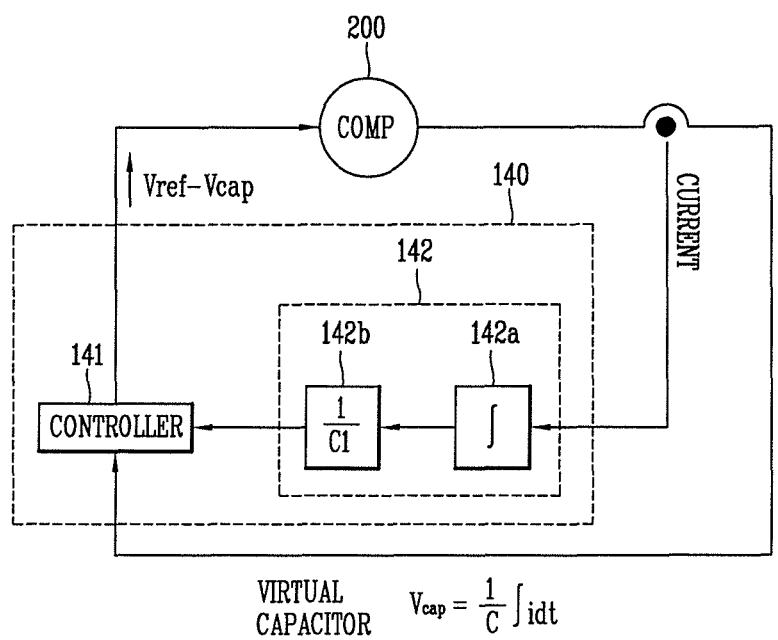
FIG. 19 is a block diagram of a virtual capacitor control in accordance with an embodiment.

FIG. 19 is a block diagram of a virtual capacitor control in accordance with an embodiment. As illustrated in FIG. 19, controller 140 according to this embodiment may include a virtual capacitor 142 and a controller 141.

The virtual capacitor 142 may include an integrator 142a, which may integrate a detected motor current, and a multiplier 142b, which may multiply a value integrated by the integrator 142a by a specific constant. The specific constant may be a value corresponding to an inverse number of a desired capacitance of the virtual capacitor but may be changed according to a computing method. However, the specific constant may be in an inverse proportion to a capacitance of the virtual capacitor.

According to this embodiment, the value obtained by multiplying the integrated value with respect to the asymmetric current offset Im_ASYM by the specific constant may be a virtual capacitor Vcap, which may be an output voltage of the virtual capacitor. The controller 141 according to this embodiment may generate, as a new reference voltage, a voltage Vref-Vcap, which may be obtained by subtracting the virtual capacitor voltage Vcap from a reference voltage Vref to generate the control signal S_CON. When the control signal is generated by the aforementioned PWM, the reference voltage Vref may correspond to a reference signal Vr illustrated in FIG. 4B.

Figure 20:
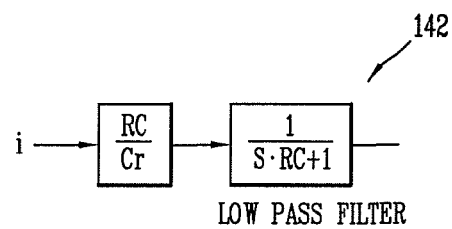
FIG. 20 is a block diagram of a virtual capacitor in a frequency area in accordance with an embodiment.

FIG. 20 is a block diagram of a virtual capacitor in a frequency area in accordance with an embodiment. As illustrated in FIG. 20, the virtual capacitor 142 may include a low pass filter (LPF), which may execute an integration, and a component, which may multiply a specific constant RC/Cr. RC denotes a multiplied value of a resistance and a capacitance associated with a cut-off frequency (or a time constant) of the low pass filter, and Cr denotes a desired capacitance of the virtual capacitor.

An aspect of applying the virtual capacitor for the asymmetric motor control may facilitate the current offset to be applied to the detected motor current Im for the asymmetric control, in such a manner of removing an AC capacitor connected to a motor of a linear compressor generally performing a resonance operation. That is, upon the existence of the AC capacitor connected to the motor, only an AC element of current elements of the motor is allowed to pass. Accordingly, in order to facilitate the current offset I_offset as a DC element to be applied, the virtual capacitor 142 may be applied instead of the real AC capacitor.

By virtue of the application of the virtual capacitor 142, the compressor may carry out an LC resonance (electric resonance operation) according to an operating frequency so as to be controlled within an unstable area. That is, when the operating frequency changes based on an LC resonant frequency, the linear compressor may enter an unstable control area, in which an output unstably changes according to an applied voltage if the operating frequency is considerably greater or smaller than the LC resonant frequency. However, the compressor control apparatus according to this embodiment may carry out the function of the virtual capacitor 142 to adjust the LC resonant frequency according to the operating frequency, thereby controlling the linear compressor not to operate within an unstable control area.

The application of the virtual capacitor 142 may also allow for a compressor control of high efficiency. A general linear compressor may include a mechanical resonant frequency, which may be determined based on a spring constant, a mass of a movable member, for example, a piston, within the compressor, for example, and an electric resonant frequency by an inductor corresponding to a compressor motor and an AC capacitor connected to the compressor motor.

In order to carry out the compressor control of high efficiency, the operating frequency of the compressor, the mechanical resonant frequency, and the electric frequency may ideally be the same as one another. However, the general linear compressor may have a difficulty in adjusting the capacitance of the AC capacitor according to a change in the mechanical resonant frequency or the operating frequency during an operation of the compressor, which may arouse a difficulty in the compressor control of high efficiency.

The compressor control apparatus according to this embodiment may control the operating frequency of the compressor to track the mechanical resonant frequency and apply the virtual capacitor 142 by removing the AC capacitor, so as to adjust the capacitance of the virtual capacitor 142 according to the change in the operating frequency in response to the change in the mechanical resonant frequency during operation, thereby enabling compressor control of high efficiency. The mechanical resonant frequency may refer to an MK resonant frequency. The MA resonant frequency may be defined by a mass (M) of a movable member including a piston and a permanent magnet, and a spring constant (K) of springs that supports the movable member.

The movable member may be supported by mechanical springs at both sides thereof based on a linear moving direction with respect to a fixed member including a cylinder and stators. Therefore, the controller 140 may calculate an MK resonant frequency, which may be defined by the mass (M) of the movable member, and the spring constant (K) of the supporting springs that support the movable member.

The controller 140 may also optimize the efficiency of the linear compressor by controlling the drive 110 such that a frequency of power applied to the linear motor (or a driving frequency, or an operating frequency from the perspective of the compressor motor) tracks the MK resonant frequency. In order to ensure optimality for the efficiency of the linear compressor, an electric resonant frequency, which is based on an inductor corresponding to the linear motor, and a capacitor (or an AC capacitor) included in or connected to the linear motor, may track the operating frequency.

However, a physical capacitor included in or connected to the linear motor may be difficult to adjust or control the capacitance. Therefore, in accordance with this embodiment, a virtual capacitor may be utilized to control a linear compressor in such a manner that the electric resonant frequency may be controlled to track the operating frequency by adjusting the capacitance of the virtual capacitor when the operating frequency changes according to the mechanical resonant frequency. That is, in accordance with this embodiment, the controller 140 may control the operating frequency of the linear compressor to track the mechanical resonant frequency of the linear compressor. When the operating frequency is adjusted due to the change in the mechanical resonant frequency during the driving of the linear compressor, the controller 140 may adjust the specific constant such that the electric resonant frequency, which is based on the inductor corresponding to the motor and the virtual capacitor, may track the adjusted operating frequency. The adjustment of the specific constant may result in the adjustment of the capacitance of the virtual capacitor, which may allow the linear compressor to have optimal efficiency. A compressor having such compressor control apparatus according to embodiments disclosed herein may have a reduced fabricating cost due to an absence of a physically-existing AC capacitor.

Figure 21:
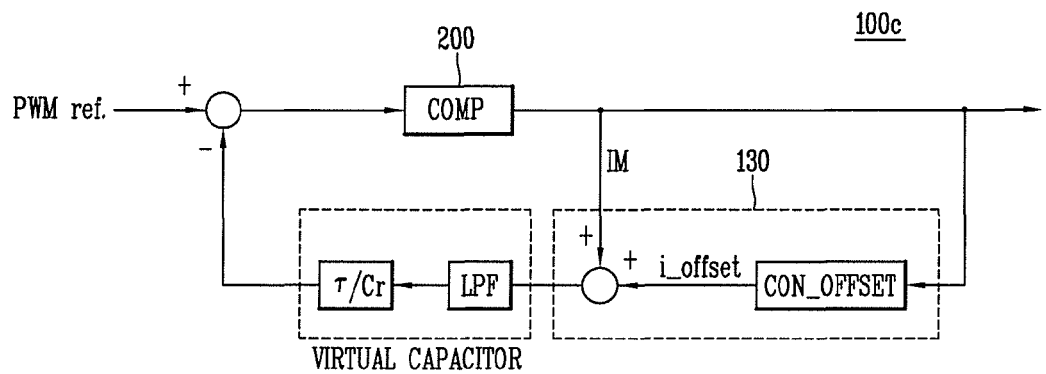
FIG. 21 is a block diagram illustrating an apparatus for controlling a linear compressor having a virtual capacitor for performing an asymmetric control, in accordance with an embodiment.

FIG. 21 is a block diagram of a compressor control apparatus with a virtual capacitor for performing an asymmetric control, in accordance with an embodiment. As illustrated in FIG. 21, asymmetric current generator 130 of apparatus 100c according to this embodiment may generate an asymmetric motor current Im_ASYM by applying a current offset i_offset to a motor current Im detected from a linear compressor without an AC capacitor. The virtual capacitor may allow the asymmetric motor current Im_ASYM to pass through a low pass filter LPF, and multiply a specific constant (where τ is a time constant related to a cut-off frequency of the LPF) to generate a virtual capacitor voltage (corresponding to the aforementioned Vcap).

The apparatus 100c may generate a new reference voltage by combining or subtracting the virtual capacitor voltage from a reference signal PWM ref (corresponding to the aforementioned Vref) for generating a PWM control signal S_CON, and generate the control signal S_CON based on the new reference voltage. Accordingly, the apparatus 100c may control the linear compressor by driving the drive 110 based on the control signal S_CON.

The following embodiment may be implemented in part or as a combination of components or steps included in embodiments which have been or will be discussed hereinafter. For description of this embodiment, redundant parts will be understood accordingly, and description thereof has been omitted.

This embodiment illustrates a compressor control apparatus capable of controlling a number of turns of a motor coil to manage an overload when the compressor is overloaded, and a control method thereof. A motor of a linear compressor according to this embodiment may include a coil portion provided with a first coil and a second coil, and a switching element, which may control a coil corresponding to the motor to be selectively a combination of the first and second coils or the first coil according to a switching control signal. The switching element may be a relay switch, for example.

The switching control signal may be generated based on a load of the linear compressor and/or an operation mode of the linear compressor. The operation mode of the linear compressor may be at least one of a high-efficiency mode or an overload management mode.

The controller 140 according to this embodiment may generate a switching control signal in such a manner that the coil of the motor may be a coil formed by combining the first coil and the second coil for enhancing efficiency of the linear compressor when the operation mode is the high-efficiency mode. Or, the controller 140 may generate the switching control signal in such a manner that the coil of the motor may be the first coil to prevent a shortage of voltage applied to the motor of the compressor due to an overload when the operation mode is the overload management mode.

The term "overload management mode" refers to an operation mode when the detected motor current is '0' for a predetermined period of time or a shortage of voltage of the motor of the compressor is caused due to an overload state. The overload management mode may be determined based on the motor current or the motor voltage. The overload management mode may also be determined based on a load of the linear compressor or a cooling capacity command value applied to the linear compressor.

In accordance with this embodiment, the controller 140 may generate the switching control signal such that the coil of the motor may be the first coil when the load of the compressor is greater than a second reference load (corresponding to the overload management mode), and generate the switching control signal such that the coil of the motor may be a coil formed by combining the first coil and the second coil when the load of the compressor is smaller than the second reference load (corresponding to the high-efficiency mode). The second reference load, for example, may be a load more than 300 watts.

When the compressor is overloaded, the shortage of voltage applied to the motor may be caused due to the overload of the compressor with the virtual capacitor. When the compressor is overloaded, apparatus 100d according to this embodiment (FIG. 22) may selectively reduce the number of turns of the motor coil so as to prevent the shortage of voltage applied to the motor. The term "voltage shortage" may refer to a voltage shortage of the compressor motor due to an overload state of the compressor motor.

That is, when the compressor is in a normal state (or in a normal load state other than an overload state, or in a high-efficiency mode), the apparatus 100d according to this embodiment may increase the number of turns of the motor coil so as to increase efficiency of the compressor by controlling the motor coil to be a combination of the first coil and the second coil. When the compressor is overloaded (or the operation mode is the overload management mode), the apparatus 100d may control the coil of the motor to be the first coil, and thus, reduce the number of turns of the motor coil, thereby avoiding the shortage of voltage applied to the motor. The term "overload" may refer to a load greater than a "high load."

Therefore, the control apparatus 100d for a linear compressor according to this embodiment may carry out the asymmetric control or the counter-asymmetric control in the high load or overload state such that the compressor may output an optimal cooling capacity. Also, when the compressor is in the overload state, the apparatus 100d may control the compressor to reduce the number of turns of the motor coil so as to prevent the shortage of voltage applied to the motor.

Figure 22:
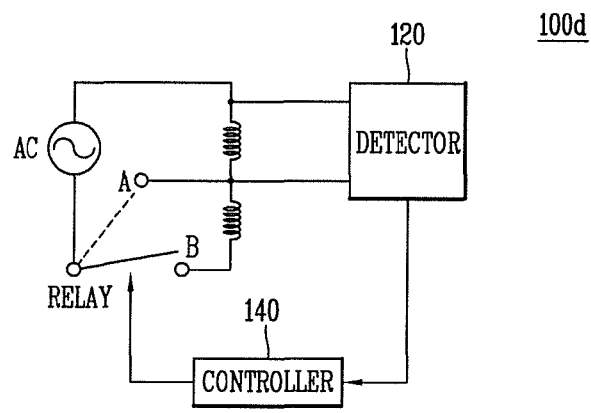
FIG. 22 is a block diagram of an apparatus for controlling a linear compressor in accordance with another embodiment.

FIG. 22 is a block diagram of an apparatus for controlling a linear compressor in accordance with another embodiment. As illustrated in FIG. 22, a control apparatus 100d according to this embodiment may include controller 140 that outputs a switching control signal based on a current detected by detector 120 that detects a current applied to a motor, and a switching element, for example, a relay switch, which may switch a flow of current by switching a coil of the motor into a first coil or first and second coils of the motor according to the switching control signal.

Hereinafter, an operation of an apparatus for controlling a linear compressor according to this embodiment will be described.

First, an initial driving of the linear compressor may be carried out in a high-efficiency mode, in which a motor is driven by receiving (AC) power through the first and second coils in response to the switching element being in contact with point B by an output control signal of the controller 140. The high-efficiency mode may include an operation mode or a driving mode related to a symmetric, asymmetric, or counter-asymmetric control of the linear motor, for example, the symmetric control mode, the asymmetric control mode, or the counter-asymmetric control mode.

The controller 140 may recognize a current zone as an overload state when a current dead zone in which a current applied to the motor detected by the detector 120 is '0' is maintained for a predetermined period of time or more. Accordingly, the controller 140 may output a control signal corresponding to the overload state to the switching element. The switching element may then carry out switching from point B to point A, thereby reducing the number of turns from the first and second coils to the first coil to avoid the voltage shortage. This operation mode may be referred to as an overload management mode, and a mode before the switching element carries out the switching may be referred to as the high-efficiency mode.

In the overload management mode, a deficient voltage may be compensated to prevent the shortage of voltage, and a current dead zone, in which the motor current is '0' for more than a predetermined period of time may be maintained for a predetermined period of time or more, such that the controller 140 may easily recognize the overload management mode. Therefore, through these processes, when a current dead zone, in which a detected current applied to the motor is '0' is maintained for more than a predetermined period of time, the apparatus 100d according to this embodiment may switch a high-efficiency management mode to an overload management mode by reducing the number of turns of the coil. Accordingly, a deficient voltage may be compensated to avoid the shortage of voltage, which may result in ensuring a current applied to the motor to manage the overload.

In accordance with this embodiment, the determination of the overload may be carried out in various manners. For example, the overload state may refer to a case in which the compressor load is over 300 watts [W].

As illustrated in FIG. 22, the overload state may be detected based on the motor current detected by the detector 120, such that the controller 140 may enter the overload management mode. However, the overload state may also be detected by other load detecting methods.

For example, the overload management state corresponding to the operation mode or the driving mode of the compressor may be decided based on a cooling capacity command value applied to the linear compressor, in addition to the load of the linear compressor. The overload management mode may also be an operation mode or driving mode of the compressor which may be activated when the voltage shortage is detected. The apparatus 100d according to this embodiment may further include an element that detects a voltage of the motor, for example, a compressor motor voltage sensor, to detect the voltage shortage.

Figure 23:
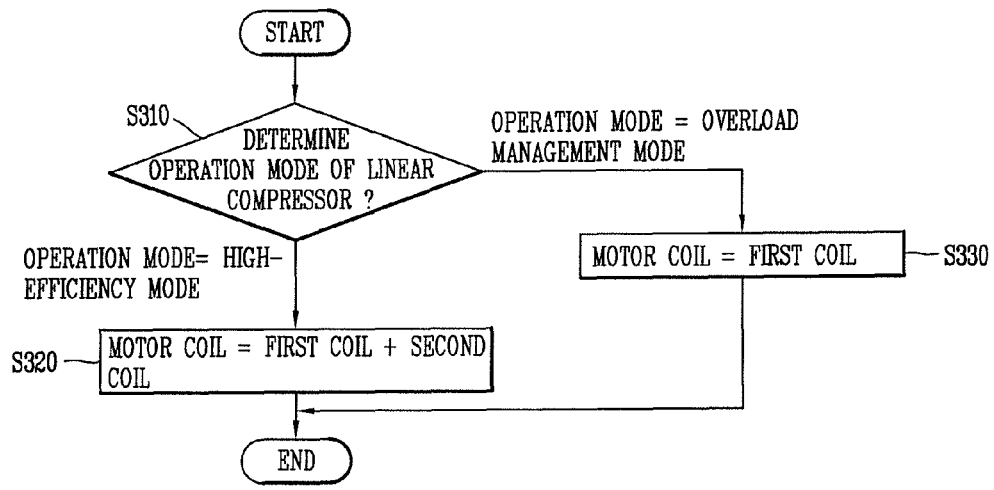
FIG. 23 is a flowchart of a method for controlling a linear compressor in accordance with another embodiment.

FIG. 23 is a flowchart of a method for controlling a compressor in accordance with another embodiment. As illustrated in FIG. 23, initially, apparatus 100d according to this embodiment may determine an operation mode or driving mode of a linear compressor (S310).

When the operation mode is a high-efficiency mode, the apparatus 100d may increase the number of turns of a motor coil in such a manner that a coil corresponding to the motor may be a coil formed by combining a first coil and a second coil (S320). When the operation mode is an overload management mode, the compressor control apparatus 100 may prevent a shortage of voltage applied to the motor by reducing the number of turns of the motor coil in such a manner that the coil corresponding to the motor may be the first coil (S330).

The following embodiment may be implemented in part or as a combination of components or steps included in embodiments which have been discussed above or will be discussed hereinafter. For description of this embodiment, redundant parts will be understood accordingly, and description thereof has been omitted.

In accordance with this embodiment, the controller 140 may set a current offset i_offset to '0' when a load of the linear compressor is smaller than a first reference load. The controller 140 may set the current offset to a value other than '0' to carry out the asymmetric control or the counter-asymmetric control when the load of the linear compressor is greater than the first reference load and smaller than a second reference load. When the load of the linear compressor is greater than a third reference load, the controller 140 may set the current offset to a value other than '0' to carry out the counter-asymmetric control and generate a switching control signal in such a manner that the coil of the motor may be the first coil. The third reference load may be the same as or greater than the second reference load.

Figure 24:
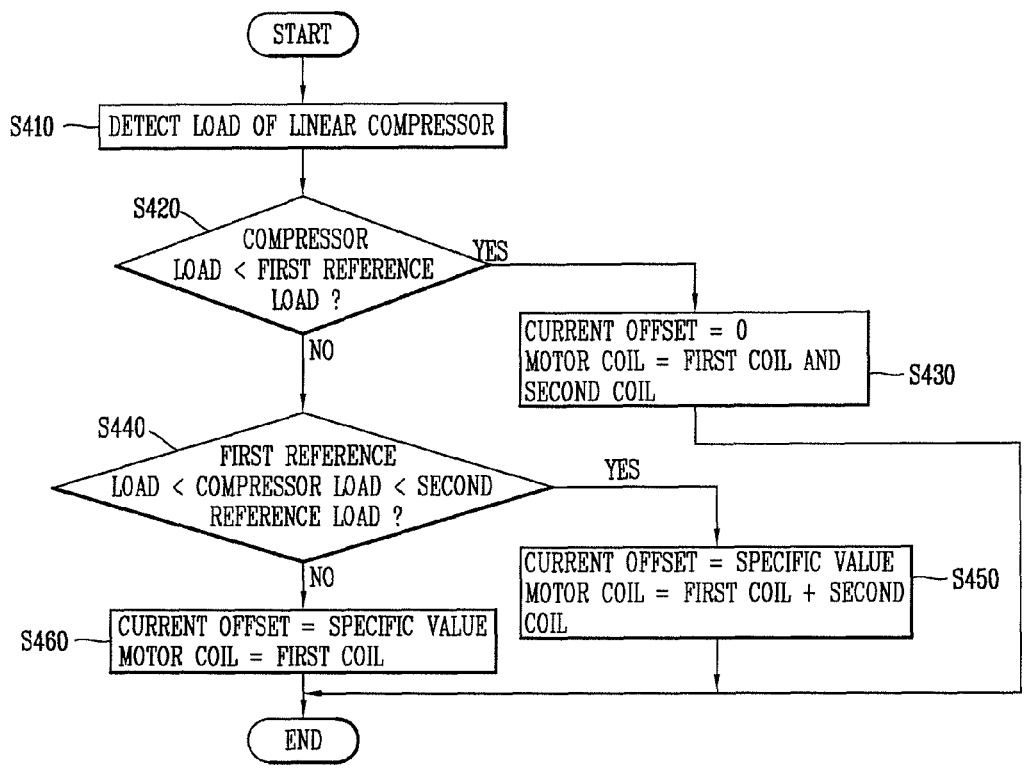
FIG. 24 is a flowchart of a method for controlling a linear compressor in accordance with another embodiment.

FIG. 24 is a flowchart of a method for controlling a compressor in accordance with another embodiment. As illustrated in FIG. 24, the apparatus 100d may detect a load of the linear compressor (S410).

When the load of the compressor is smaller than a first reference load (a first condition, corresponding to the high-efficiency mode or the symmetric control mode), the apparatus 100d may set the current offset i_offset to '0' and control the switching element such that the motor coil of the compressor may be a combination of the first coil and the second coil (S420 and S430). When the load of the compressor is greater than the first reference load and smaller than a second reference load (a second condition, corresponding to the high-load mode, the asymmetric control mode or the counter-asymmetric control mode), the apparatus 100d may set the current offset i_offset to a specific value other than '0.' In this instance, the apparatus 100d may control the switching element such that the motor coil of the compressor may be a combination of the first coil and the second coil. When the motor coil of the compressor has already been previously set to the combination of the first coil and the second coil, a state of the switching element may be maintained (S440 and S450).

When the compressor load is greater than a third reference load (a third condition corresponding to the overload management mode or the counter-asymmetric control mode), the apparatus 100d may set the current offset i_offset to a specific value other than '0' and control the switching element such that the motor coil of the compressor corresponds to the first coil (S460). The third reference load may be the same as or greater than the second reference load.

When the third reference load is greater than the second reference load, the apparatus 100d may set the current offset i_offset to the specific value other than '0' by recognizing as the third condition only a case in which the compressor load is greater than the third reference load, even though the compressor load is greater than the second reference load. The apparatus 100d may then control the switching element such that the motor coil of the compressor corresponds to the first coil. The third reference load may be a reference load which is specifically set for an entrance into the overload management mode (or for determination of the overload state). Further, the third reference load may be smaller than the second reference load.

When the third reference load is smaller than the second reference load, the apparatus 100d may carry out, in the third condition, the setting of the current offset to '0,' which is a control condition in the first condition, or the maintaining of the existing current offset value, which is a control condition in the second condition. Along with this, the apparatus 100d may control the switching element such that the motor coil of the compressor may be the first coil.

In accordance with this embodiment, the specific value of the current offset may be determined based on the load of the linear compressor or a cooling capacity command value corresponding to the linear compressor. Also, the apparatus 100d may adjust the current offset and the number of turns of the motor coil according to the operation mode or driving mode of the linear compressor 200. The operation mode may include at least one of the symmetric control mode, the asymmetric control mode, the counter-asymmetric control mode, the high-efficiency mode, or the overload management mode.

The operation modes may be separate operation modes from one another, operation modes corresponding to one another, or operation modes, a portion of which are separate from each other or correspond to each other. For example, when the operation modes are separate from each other, the operation mode of the linear compressor 200 corresponding to one point during operation of the linear compressor may be a plurality. That is, when the operation mode is the symmetric control mode and the high-efficiency mode, the controller 140 may set the current offset to '0' and generate the switching control signal such that the coil corresponding to the motor may be the coil formed by combining the first coil and the second coil.

Also, when the operation mode is the asymmetric control mode or the counter-asymmetric control mode and the high-efficiency mode, the controller 140 may set the current offset to a specific value other than '0' and generate the switching control signal such that the coil of the motor may be the coil formed by combining the first coil and the second coil. When the operation mode is the asymmetric control mode or the counter-asymmetric control mode and the overload management mode, the controller 140 may set the current offset to a specific value other than '0' and generate the switching control signal such that the coil of the motor may be the first coil.

On the other hand, when the operation modes correspond to each other, the operation mode corresponding to one point during operation of the linear compressor 200 may be one operation mode. That is, when the operation mode is the symmetric control mode or a first high-efficiency mode, the controller 140 may set the current offset to '0' and generate the switching control signal such that the coil of the motor may be the coil formed by combining the first coil and the second coil.

Also, when the operation mode is the asymmetric control mode or a second high-efficiency mode, the controller 140 may set the current offset to a specific value other than '0' and generate the switching control signal such that the coil of the motor may be the coil formed by combining the first coil and the second coil. When the operation mode is the counter-asymmetric control mode or a third high-efficiency mode, the controller 140 may set the current offset to a specific value other than '0' and generate the switching control signal such that the motor coil may be the coil formed by combining the first coil and the second coil.

The first high-efficiency mode to the third high-efficiency mode may refer to a high-efficiency mode in a narrow sense, respectively, and may be separate operation modes for distinguishing operation modes associated with the symmetric, the asymmetric, or the counter-asymmetric control mode. The high-efficiency mode in the narrow sense may refer to only the first high-efficiency mode, and a high-efficiency mode in a broad sense may include all of the first to third high-efficiency modes.

When the operation mode is the asymmetric control mode or the overload management mode, the controller 140 may set the current offset to a specific value other than '0' and generate the switching control signal such that the coil corresponding to the motor may be the first coil. When the operation mode is the counter-asymmetric control mode or the overload management mode, the controller 140 may set the current offset to a specific value other than '0' and generate the switching control signal such that the coil corresponding to the motor may be the first coil.

For example, when some of the operation modes or driving modes are corresponding to or separate from each other, the operation mode corresponding to one point during operation of the linear compressor 200 may be one or a plurality. That is, for example, when the operation mode is the symmetric control mode, the controller 140 may set the current offset to '0' and generate the switching control signal such that the coil of the motor may be the coil formed by combining the first coil and the second coil.

When the operation mode is the asymmetric control mode or the counter-asymmetric control mode, the controller 140 may set the current offset to a specific value other than '0' and generate the switching control signal such that the coil of the motor may be the coil formed by combining the first coil and the second coil. When the operation mode is the overload management mode, the controller 140 may generate the switching control signal such that the coil of the motor may be the first coil.

In accordance with this embodiment, the driving mode may be a driving mode which may be associated with the load of the linear compressor, the cooling capacity command value, or a motor voltage shortage state. For example, from the perspective of the load of the linear compressor, the symmetric control mode may correspond to a high-efficiency operation mode in the load condition similar to the first condition (or the high-efficiency mode in the narrow sense), and the asymmetric control mode may correspond to a high-load driving mode in the load condition similar to the second condition. The overload management mode may be a driving mode in the load condition similar to the third condition.

The high-efficiency mode illustrated in FIG. 23 refers to a high-efficiency mode in a broad sense, and may include the symmetric control mode, the asymmetric control mode, and the counter-asymmetric control mode. The high-efficiency in a narrow sense may include the symmetric control mode.

Besides, it will be obvious to a skilled person in this art that a combination of various operation modes or driving modes may be applied to the linear compressor control apparatus according to embodiments disclosed herein. The setting of the operation mode may be carried out by a refrigerator micom or set by the apparatus 100*d* itself, for example.

When the operation mode is set by the apparatus 100*d* itself, as discussed above, the apparatus 100*d* may detect the compressor load and decide the operation mode according to the condition of the compressor load, for example, the aforementioned first to third conditions. This is, for example, under an assumption that the first reference load is 150 watts [W] and the second reference load is 250 watts [W], when the compressor load is 100 watts [W], the apparatus 100*d* may set the current offset to '0' and control the switching element such that the motor coil of the compressor may be the coil formed by combining the first coil and the second coil.

When the compressor load is 200 watts [W], the apparatus 100*d* may set the current offset to a specific value other than '0' to operate in the symmetric control mode, and control the switching element such that the motor coil of the compressor may be the combination of the first coil and the second coil. When the compressor load is 400 watts [W], the apparatus 100*d* may set the current offset to a specific value other than '0' to operate in the counter-asymmetric control mode, and control the switching element such that the motor coil of the compressor may be the first coil.

Figure 25:
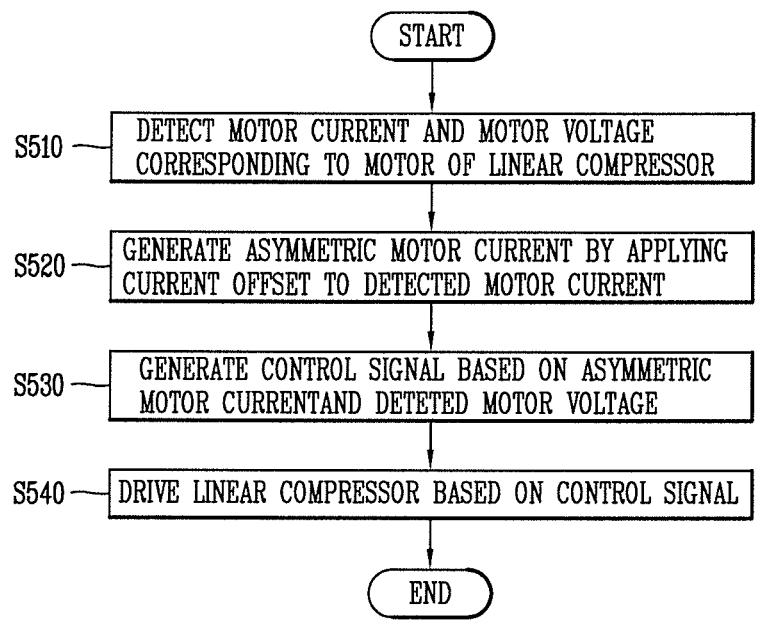
FIG. 25 is a flowchart of a method for controlling a linear compressor in accordance with another embodiment.

FIG. 25 is a flowchart of a method for controlling a compressor in accordance with another embodiment. The method according to an embodiment may include detecting a motor current and/or a motor voltage of a linear compressor (S510), generating an asymmetric motor current by applying a current offset to the detected motor current (S520), generating a control signal based on the asymmetric motor current and the detected motor voltage (S530), and driving the linear compressor based on the control signal (S540).

Hereinafter, each configuration will be described with reference to FIGS. 1 to 24. Redundant parts will be understood by the foregoing description, and description thereof has been omitted.

As illustrated in FIG. 25, the motor current and/or the motor voltage corresponding to a motor of the linear compressor may be detected (S510). The detector 120 may detect the motor current Im and the motor voltage Vm corresponding to the motor of the linear compressor.

The detector 120 may include a current detecting portion (not illustrated), which may detect the motor current Im, and a voltage detecting portion (not illustrated), which may detect the motor voltage Vm. The current detecting portion may detect a motor current applied to a motor of linear compressor 200 according to a load of the linear compressor 200 or a load of a refrigerating system, for example, a refrigerator, employing the linear compressor 200. The motor current Im may refer to a current applied to the motor of the linear compressor 200, and may be detected by a current sensor, or a current measuring instrument, for example.

The voltage detecting portion may detect a motor voltage applied between both ends of the motor of the linear compressor 200 according to the load of the linear compressor 200 or the load of the refrigerating system, for example, the refrigerator, employing the linear compressor 200. The motor voltage Vm may refer to a voltage applied to the motor of the linear compressor 200, and may be detected by a voltage sensor (configured as a voltage differential amplifier), or a voltage measuring instrument.

Next, the asymmetric motor current may be generated by applying the current offset to the detected motor current (S520). The asymmetric current generator 130 or the controller 140 may generate an asymmetric motor current to carry out an asymmetric control for increasing an optimal cooling capacity by electrically moving an initial value of a piston by a predetermined value toward a bottom dead center when a load of the linear compressor 200 increases, namely, when a high cooling capacity is required, or generate an asymmetric motor current to carry out a counter-asymmetric control for preventing an impact applied to the piston by electrically moving the initial value of the piston by a predetermined value toward a top dead center when the impact is applied to the piston due to the piston moving toward the bottom dead center over a stroke peak or a mechanical limit.

In accordance with one embodiment, the current offset may be determined based on an operation mode of the linear compressor, a load of the linear compressor, or a cooling capacity command value applied to the linear compressor. In addition, the current offset may be determined based on at least one of an asymmetry ratio of a stroke based on the initial value of the piston, a comparison result between a motor current and a preset or predetermined motor current peak value, a comparison result between a detected stroke and the preset or predetermined stroke peak value, or a detected top dead center In accordance with one embodiment, the compressor may operate in at least one control mode of a symmetric control mode, an asymmetric control mode, or a counter-asymmetric control mode. The current offset may be set to '0' when the operation mode is the symmetric control mode, and set to a specific value other than '0' when the operation mode is the asymmetric control mode or the counter-asymmetric control mode. A current offset applied to perform the counter-asymmetric control and a current offset applied to perform the asymmetric control may have different signs from each other.

The current offset may be determined based on an asymmetry ratio of the stroke based on the initial value of the piston. In accordance with one embodiment, when the stroke asymmetry ratio is greater than a preset or predetermined target asymmetry ratio, the current offset may be changed in such a manner that the initial value of the piston may be moved toward a top dead center. On the other hand, when the stroke asymmetry ratio is smaller than the preset or predetermined target asymmetry ratio, the current offset may be changed in such a manner that the initial value of the piston may be moved toward a bottom dead center.

Also, the current offset may be determined based on a comparison result between a motor current and a preset or predetermined motor current peak value. In accordance with one embodiment, when the motor current is greater than the preset or predetermined motor current peak value, the current offset may be changed in such a manner that the initial value of the piston may be moved toward a top dead center. On the other hand, when the motor current is smaller than the preset or predetermined motor current peak value, the current offset may be changed in such a manner that the initial value of the piston may be moved toward a bottom dead center.

Also, the current offset may be determined based on a comparison result between a detected stroke and a preset or predetermined stroke peak value. In accordance with one embodiment, when the detected stroke is greater than the preset or predetermined stroke peak value, the current offset may be changed in such a manner that the initial value of the piston may be moved toward a top dead center. On the other hand, when the detected stroke is smaller than the preset or predetermined stroke peak value, the current offset may be changed in such a manner that the initial value of the piston may be moved toward a bottom dead center.

Also, the current offset may be determined based on a detected top dead center. In order for the detected top dead center to be '0,' the current offset may be changed in such a manner that the initial value of the piston is moved toward a top dead center or a bottom dead center. In accordance with one embodiment, the current offset may be set to '0' when a load of the linear compressor is less than a first reference load or a cooling capacity command value is less than a first reference cooling capacity.

Next, the control signal may be generated based on the asymmetric motor current and/or the detected motor voltage (S530). The asymmetric current generator 130 may generate an asymmetric motor current Im_ASYM by applying a current offset I_offset decided by a current offset controller CON_OFFSET to the motor current Im detected by the detector 120.

Next, the linear compressor 200 may be driven based on the control signal (S540). The drive 110 may generate a motor driving signal S_PWM based on a control signal S_CON applied from the controller 140, and drive the linear compressor 200 by applying the motor driving signal S_PWM to the linear compressor 200.

In accordance with one embodiment, the linear compressor 200 may be a resonance compressor, which carries out a resonance operation based on an inductor corresponding to a motor and a virtual capacitor. The virtual capacitor may be implemented as the control signal may be generated based on a capacitor voltage obtained by multiplying an integrated value with respect to the asymmetric current offset by a specific constant.

The motor of the linear compressor 200 may include a coil provided with a first coil and a second coil, and a switching element which may control a coil corresponding to the motor to be selectively a coil formed by combining the first and second coils or the first coil according to a switching control signal. The switching control signal may be generated based on the load of the linear compressor 200. The switching control signal may control the switching element, such that the coil corresponding to the motor may be the first coil when a load of the linear compressor 200 is greater than a second reference load, and control the switching element such that the coil corresponding to the motor may be a coil in the form of selectively combining the first and second coils when the load of the linear compressor 200 is smaller than the second reference load.

In accordance with one embodiment, the linear compressor 200 may be driven in at least one operation mode and/or driving mode of a symmetric mode, an asymmetric mode, a counter-asymmetric mode, a high-efficiency mode, and an overload management mode by the controller 140. Description thereof will be understood by the foregoing description, and thus, has been omitted.

The method for controlling a linear compressor according to embodiments disclosed herein may be implemented in the form of program instructions readable by various computer components and may be recorded on a computer-readable recording medium. The recording medium may include program instructions, a data file, a data structure, or a combination thereof. The program instructions recorded on the recording medium may be designed and configured specifically for embodiments disclosed herein or may be publicly known and available to those who are skilled in the field of computer software. Examples of the recording medium may include a magnetic medium, such as a hard disk, a floppy disk, or a magnetic tape, an optical medium, such as a CD-ROM, or a DVD, for example, a magneto-optical medium, such as a floptical disk, or a hardware device, such as a ROM, a RAM, or a flash memory, for example, specially configured to store and perform the program instructions. Examples of the program instructions may include a high-level language code executable by a computer with an interpreter, in addition to a machine language code made by a compiler. The above exemplary hardware device may be configured to operate as one or more software modules in order to perform the operation of the embodiments disclosed herein, and vice versa.

A linear compressor with a compressor control apparatus in accordance with embodiments disclosed herein may include a fixed member including a compression space therein, a movable member that linearly reciprocates in the fixed member to compress a refrigerant suctioned into the compression space, at least one spring installed to elastically support the movable member in a motion direction of the movable member, a motor connected to the movable member to linearly reciprocate the movable member in an axial direction, and a control apparatus. The control apparatus may be the apparatus for controlling a linear compressor according to embodiments disclosed herein.

Hereinafter, one example of a linear compressor to which the apparatus for controlling a linear compressor according to embodiments disclosed herein may be applied will be described with reference to FIG. 26. However, it is not intended to limit the scope, and the apparatus for controlling a linear compressor according to embodiments disclosed herein may also be applicable to other types of linear compressors.

In a motor which is generally applied to a compressor, a winding coil may be wound on a stator and a magnet may be installed on a mover, such that the mover may perform a rotary motion or a reciprocating motion by an interaction between the winding coil and the magnet. The winding coil may be formed in various shapes according to a type of motor. For example, for a rotational motor, a coil may be wound on a plurality of slots, which may be formed on an inner circumferential surface of the stator along a circumferential direction, in a concentrated or distributed manner. For a reciprocal motor, a coil may be rolled into an annular shape to form a winding coil and a plurality of core sheets may be inserted onto an outer circumferential surface of the winding coil along a circumferential direction. For the reciprocal motor, as the winding coil is formed by winding the coil into the annular shape, the winding coil may be generally formed by winding the coil onto an annular bobbin, which may be made of plastic.

Figure 26:
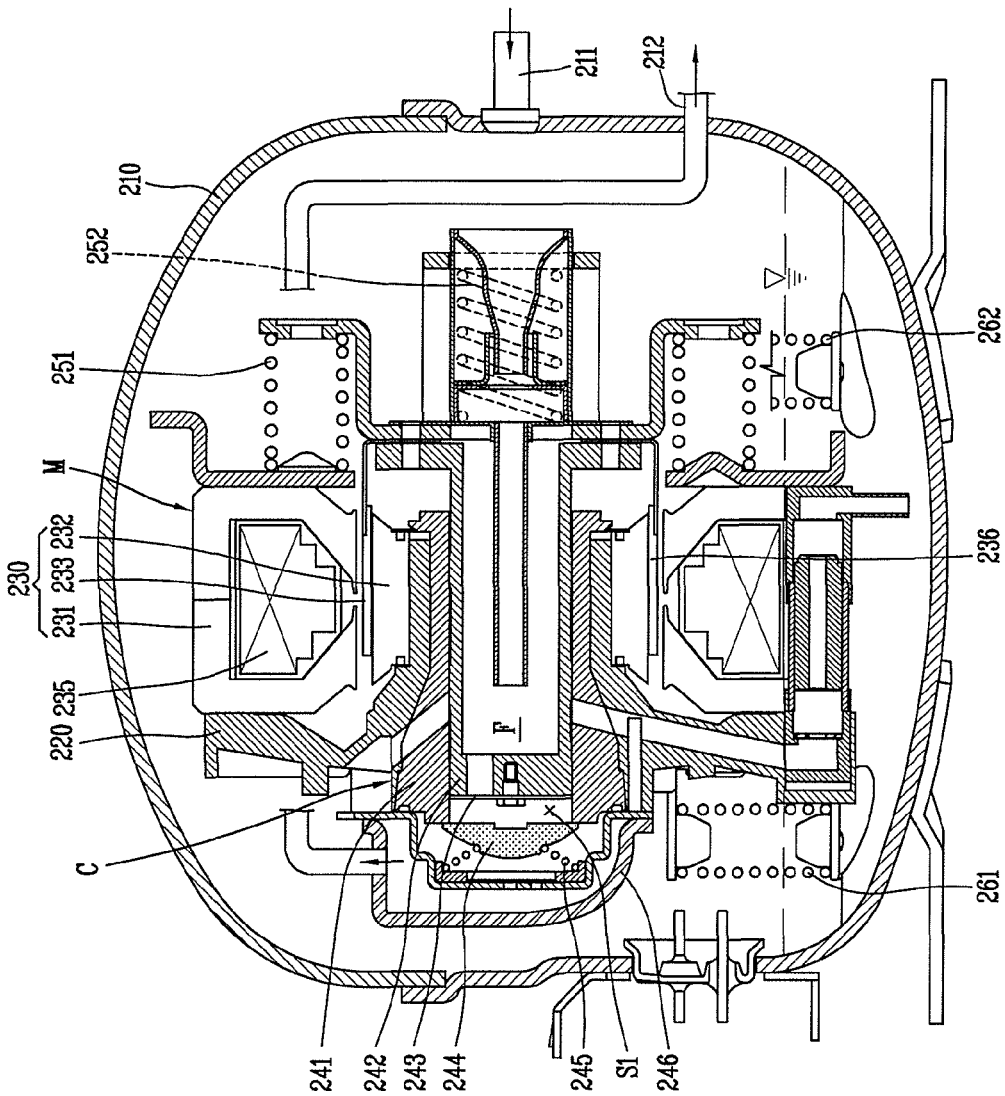
FIG. 26 is a sectional view of a linear compressor in accordance with an embodiment.

FIG. 26 is a sectional view of a linear compressor in accordance with an embodiment. As illustrated in FIG. 26, a reciprocating compressor may include a frame 220, which may be elastically installed in an inner space of a hermetic shell 210 by a plurality of support springs 261 and 262. A suction pipe 211, which may be connected to an evaporator (not illustrated) of a refrigeration cycle, may be installed in the inner space of the shell 210 in a communicating manner, and a discharge pipe 212, which may be connected to a condenser (not illustrated) of the refrigeration cycle may be installed at one side of the suction pipe 212.

An outer stator 231 and an inner stator 232 of a reciprocal motor 230, which may define a motor part M may be fixed to the frame 220, and a mover 233, which may perform a reciprocating motion, may be installed between the outer stator 231 and the inner stator 232. A piston 242, which may form a compression part C together with a cylinder 241, may be coupled to the mover 233 of the reciprocal motor 230 so as to perform a reciprocating motion.

The cylinder 241 may be installed within a range overlapping the stators 231 and 232 of the reciprocal motor 230 in an axial direction. A compression space S1 may be formed in the cylinder 241, and a suction passage F, which may guide a refrigerant into the compression chamber S1, may be formed in the piston 242. A suction valve 243, which may open and close the suction passage F, may be installed at an end of the suction passage F, and a discharge valve 244 which opens and closes the compression space S1 of the cylinder 241 may be installed at an end surface of the cylinder 241.

A plurality of resonance springs 251 and 252, which may induce a resonant motion of the piston 242, may be installed at both sides or ends of the piston 242 in the motion direction of the piston 242, respectively. Unexplained reference numeral 235 denotes a winding coil, 236 denotes a magnet, 245 denotes a valve spring, and 246 denotes a discharge cover.

In the related art reciprocating compressor, when power is applied to the coil 235 of the reciprocal motor 230, the mover 233 of the reciprocal motor 230 may perform a reciprocating motion. Accordingly, the piston 242 coupled to the mover 233 may perform the reciprocating motion at high speed within the cylinder 241 such that the refrigerant may be introduced into the inner space of the shell 210 through the suction pipe 211. The refrigerant within the inner space of the shell 210 may then be introduced into the compression space S1 of the cylinder 241 through the suction passage F of the piston 242, and then discharged from the compression space S1 when the piston is moved forward so as to flow toward a condenser of a refrigeration cycle through the discharge pipe 212. The series of processes may be repeated.

The outer stator 231 may be formed in such a manner of radially laminating a plurality of thin half stator cores, which may be formed in a shape similar to '⊂' to be symmetrical in left and right directions, on both left and right sides of the winding coil 235. Accordingly, the outer stator 231 may have a form that neighboring core sheets come in contact with each other on both sides of an inner circumferential surface thereof and are spaced from each other by a predetermined gap at both sides of an outer circumferential surface thereof.

A refrigerator employing a linear compressor controlled by the compressor control method according to embodiments disclosed herein may include a refrigerator main body, a linear compressor provided in the refrigerator main body to compress a refrigerant, and a control apparatus. The control apparatus of the linear compressor may be the apparatus for controlling a linear compressor according to embodiments disclosed herein.

Hereinafter, one example of a refrigerator to which the apparatus for controlling a linear compressor according to embodiments disclosed herein may be applied or used will be described with reference to FIG. 27. However, it is not be intended to limit the scope, and the apparatus for controlling a linear compressor according to embodiments disclosed herein may also be applicable to other types of linear compressors.

Figure 27:
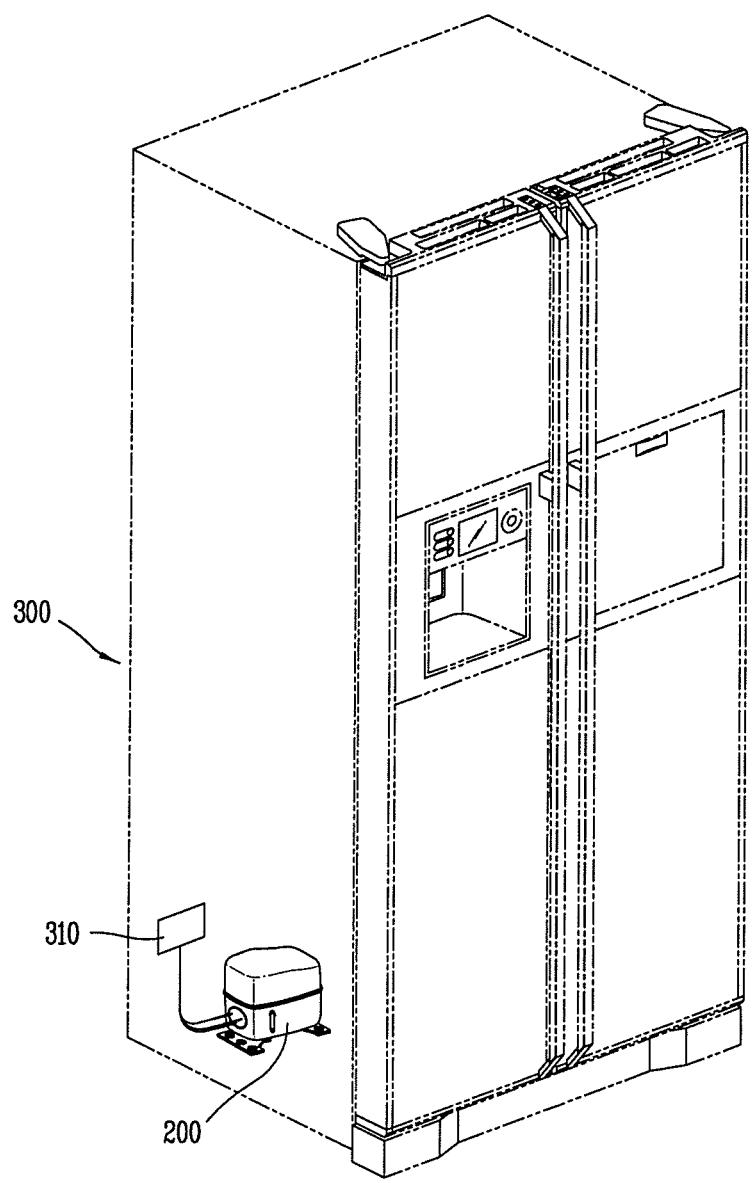
FIG. 27 is a perspective view of a refrigerator with a linear compressor in accordance with an embodiment.

FIG. 27 is a perspective view of a refrigerator with a linear compressor in accordance with an embodiment. As illustrated in FIG. 27, a refrigerator 300 may include a main board 310, which may control an overall operation of the refrigerator and be connected with a reciprocating compressor 200. The apparatus for controlling a linear compressor according to embodiments disclosed herein and a three-phase motor drive may be provided on the main board 310. The refrigerator 300 may operate as the reciprocating compressor 200 is driven. Cooling air supplied into the refrigerator may be generated by heat-exchange of a refrigerant, and the refrigerant may be continuously supplied into the refrigerator through repetition of a cycle of compression-condensation-expansion-evaporation. The supplied refrigerant may be evenly transferred into the refrigerator by a convectional current, such that food or other items may be kept in the refrigerator at a desired temperature.

As described above, in an apparatus for controlling a linear compressor and a control method in accordance with embodiments disclosed herein, an optimal freezing capacity may be increased by way of basically setting a small initial position (or a small initial value) of a piston and electrically moving the initial value of the piston in a high-load driving area. This may result in ensuring control stability and optimizing efficiency of the linear compressor.

Also, in an apparatus for controlling a linear compressor and a control method thereof in accordance with embodiments disclosed herein, a movement of a piston may be limited based on at least one of a stroke asymmetry ratio based on an initial value of the piston, a comparison result between a motor current and a preset or predetermined motor current peak value, a comparison result between a detected stroke and a preset or predetermined stroke peak value, or a detected top dead center, such that the piston may be prevented from being moved over the stroke peak. This may result in improving durability of the compressor by preventing an impact from being applied to the compressor due to the piston, or preventing a generation of noise due to an impact. Accordingly, as stiffness of a spring that elastically supports the piston may be reduced or such spring may be removed, an operation of a low operating frequency may be allowed, resulting in improving efficiency of the compressor.

Also, in an apparatus for controlling a linear compressor and a control method thereof in accordance with embodiments disclosed herein, a virtual capacitor may be applied so as to facilitate an asymmetric control based on a current offset. Also, by virtue of the application of the virtual capacitor, the linear compressor may carry out an LC resonant operation according to an operating frequency so as to be controlled in an unstable area. This may result in enabling a high-efficiency compressor control and reducing a fabricating cost by virtue of a removal of an AC capacitor.

Also, in an apparatus for controlling a linear compressor and a control method thereof in accordance with embodiments disclosed herein, a shortage of voltage applied to a compressor motor under an overload state may be solved by a 2-tap control of reducing a number of turns of a motor coil in an overload state.

Embodiments disclosed herein provide an apparatus and method for controlling a linear compressor, capable of increasing a maximum cooling capacity of the linear compressor or preventing a piston from being moved over a stroke peak, in a manner of varying (changing) an initial value of the piston depending on conditions.

Embodiments disclosed herein provide an apparatus for controlling a linear compressor. The apparatus may include a driving unit or drive configured to drive the linear compressor based on a control signal, a detector configured to detect a motor current of the linear compressor, an asymmetric current generator configured to generate an asymmetric motor current by applying a current offset to the detected motor current, and a controller configured to generate the control signal based on the asymmetric motor current. The current offset may be changed based on a change in a position of a piston.

The current offset may be decided or determined based on an asymmetry ratio of a stroke based on an initial value of the piston. The current offset may be changed such that the initial value of the piston is moved toward a top dead center when the asymmetry ratio of the stroke is greater than a preset or predetermined desired or target asymmetry ratio. Or, the current offset may be changed such that the initial value of the piston is moved toward a bottom dead center when the asymmetry ratio of the stroke is smaller than the preset desired asymmetry ratio.

The current offset may be decided or determined based on a comparison result between the motor current and a preset or predetermined motor current peak value. The current offset may be changed such that the initial value of the piston is moved toward a top dead center when the motor current is greater than the preset motor current peak value. Or, the current offset may be changed such that the initial value of the piston is moved toward a bottom dead center when the motor current is smaller than the preset motor current peak value.

The current offset may be decided or determined based on a comparison result between a detected stroke and a preset or predetermined stroke peak value. The current offset may be changed such that the initial value of the piston is moved toward a top dead center when the detected stroke is greater than the preset stroke peak value. Or, the current offset may be changed such that the initial value of the piston is moved toward a bottom dead center when the detected stroke is smaller than the preset stroke peak value.

The current offset may be decided or determined based on a detected top dead center. The current offset may be changed such that the initial value of the piston is moved toward a top dead center or a bottom dead center, and thus, the detected top dead center is '0.'

The controller may detect a stroke based on the asymmetric motor current and the motor voltage of the linear compressor, and generate the control signal based on the detected stroke. The controller may detect a phase difference between a phase of the asymmetric motor current and a phase of the detected stroke, detect the top dead center of the linear compressor based on the phase difference, and generate the control signal based on the detected top dead center.

The controller may detect a phase difference between a phase of the asymmetric motor current and a phase of the detected stroke, detect a gas spring constant based on the phase difference, the asymmetric motor current and the detected stroke, and generate the control signal based on the gas spring constant. The controller may detect a top dead center of the linear compressor based on the gas spring constant, and generate the control signal based on the detected top dead center.

The current offset may be changed according to a change in a load of the linear compressor or a cooling capacity command value applied to the linear compressor. The current offset may be changed according to an operation mode of the linear compressor, and the operation mode may be at least one of a symmetric control mode, an asymmetric control mode or a counter-asymmetric control mode.

The operation mode may be decided or determined based on a load of the linear compressor or a cooling capacity command value applied to the linear compressor. The controller may set the current offset to '0' when the operation mode is the symmetric control mode, and set the current offset to a value other than '0' when the operation mode is the asymmetric control mode or the counter-asymmetric control mode.

The current offset when the operation mode is the asymmetric control mode and the current offset when the operation mode is the counter-asymmetric control mode may have opposite signs to each other.

The current offset may be decided or determined based on at least one of an asymmetry ratio of a stroke based on an initial value of the piston, a comparison result between the motor current and a preset or predetermined motor current peak value, a comparison result between the detected stroke and a preset or predetermined stroke peak value, or a detected top dead center.

The current offset may be decided or predetermined based on a load of the linear compressor or a cooling capacity command value applied to the linear compressor. The load of the linear compressor may be detected based on at least one of an absolute value of a phase difference between a current applied to the linear compressor and a stroke, an outer temperature of the linear compressor, an inner temperature of the linear compressor, or a temperature of a condenser and an evaporator within a refrigeration cycle.

A moved amount of the initial value of the piston by the current offset may be proportional to a motor constant of the linear compressor and the current offset. The moved amount of the initial value of the piston by the current offset may be inversely proportional to a spring constant of a spring installed to elastically support the piston in a motion direction. The controller may detect the motor constant based on the detected motor current or the asymmetric motor current and control the current offset based on the detected motor constant.

The linear compressor may operate in sequence of a symmetric control mode, a counter-asymmetric control mode, and an asymmetric control mode. When operating in the asymmetric control mode after the counter-asymmetric control mode, the linear compressor may operate in the asymmetric control mode during a driving by a top dead center control method.

The linear compressor may perform a resonant operation based on an inductor corresponding to the motor and a virtual capacitor. The controller may integrate the asymmetric motor current, calculate a capacitor voltage by multiplying the integrated value by a specific constant value, and implement the virtual capacitor by generating the control signal based on the calculated capacitor voltage.

The motor of the linear compressor may include a coil provided with a first coil and a second coil, and a switching element, which may control a coil corresponding to the motor to be a combination of the first and second coils or the first coil according to a switching control signal. The switching control signal may be generated based on a load of the linear compressor. The controller may generate the switching control signal, such that the coil of the motor may be the first coil when the load of the linear compressor is greater than a second reference load, and generate the switching control signal such that the coil of the motor may be a coil in the form of combining the first coil and the second coil when the load of the compressor is smaller than the second reference load.

The controller may set the current offset to '0' when the load of the linear compressor is smaller than a first reference load. The controller may set the current offset to a value other than '0' when the load of the linear compressor is greater than the first reference load and smaller than a second reference load. When the load of the linear compressor is greater than a third reference load, the controller may generate the switching control signal in such a manner that the coil of the motor may be the first coil. The third reference load may be the same as or greater than the second reference load.

The switching control signal may be generated based on an operation mode of the linear compressor. The operation mode of the linear compressor may be at least one of a symmetric mode, an asymmetric mode, a counter-asymmetric mode, a high-efficiency mode, or an overload management mode.

The controller may generate the switching control signal such that the coil of the motor may be a coil in the form of combining the first coil and the second coil when the operation mode is a high-efficiency mode. The controller may generate the switching control signal such that the coil of the motor may be the first coil when the operation mode is an overload management mode.

The controller may set the current offset to '0' when the operation mode is the symmetric control mode, and set the current offset to a value other than '0' when the operation mode is the asymmetric control mode or the counter-asymmetric control mode. The controller may set the current offset to '0' and generate the switching control signal such that the coil of the motor may be a coil in the form of combining the first coil and the second coil when the operation mode is the symmetric control mode, and may set the current offset to a value other than '0' and generate the switching control signal such that the coil of the motor may be the coil in the form of combining the first coil and the second coil when the operation mode is the asymmetric control mode or the counter-asymmetric control mode.

The overload management mode may be decided or determined when the detected motor current is less than '0' for a predetermined time, decided or determined when a deficient voltage is applied to the motor of the linear compressor due to an overload state, or decided or determined based on the load of the linear compressor or the cooling capacity command value applied to the linear compressor.

Embodiments disclosed herein further provide a linear compressor including a fixed member, which may include a compression space therein, a movable member which may linearly reciprocate in the fixed member to compress a refrigerant sucked into the compression space, at least one spring which may be installed to elastically support the movable member in a motion direction of the movable member, a motor, which may be connected to the movable member to linearly reciprocate the movable member in an axial direction, and a control apparatus of the linear compressor.

Also, embodiments disclosed herein further provide a refrigerator including the linear compressor, and a cooling chamber which defines at least one space to receive cold air by a refrigeration cycle with the linear compressor.

Embodiments disclosed herein further provide a method of controlling a linear compressor. The method may include detecting a motor current and a motor voltage corresponding to a motor of the linear compressor, generating an asymmetric motor current by applying a current offset to the detected motor current, generating a control signal based on the asymmetric motor current and the detected motor voltage, and driving the linear compressor based on the control signal. The current offset may be changed based on a change in a position of a piston.

The current offset may be decided or determined based on at least one of an asymmetry ratio of a stroke based on an initial value of the piston, a comparison result between the motor current and a preset or predetermined motor current peak value, a comparison result between a detected stroke and a preset or predetermined stroke peak value, or a detected top dead center. The current offset may be decided based on an operation mode of the linear compressor, a load of the linear compressor, or a cooling capacity command value applied to the linear compressor. The operation mode may be at least one of a symmetric control mode, an asymmetric control mode, or a counter-asymmetric control mode. The current offset may be set to '0' when the operation mode is the symmetric control mode, and set to a value other than '0' when the operation mode is the asymmetric control mode or the counter-asymmetric control mode.

The linear compressor may perform a resonant operation based on an inductor corresponding to the motor and a virtual capacitor. The linear compressor may integrate the asymmetric motor current, calculate a capacitor voltage by multiplying the integrated value by a specific constant value, and implement the virtual capacitor by generating the control signal based on the calculated capacitor voltage.

The motor of the linear compressor may include a coil portion provided with a first coil and a second coil, and a switching element, which may control a coil corresponding to the motor to be selectively a combination of the first and second coils or the first coil according to a switching control signal. The switching control signal may be generated based on the load of the linear compressor. The switching control signal may control the switching element such that the coil corresponding to the motor may be the first coil when the load of the linear compressor is greater than a second reference load, and control the switching element such that the coil corresponding to the motor may be a coil in the form of combining the first and second coils when the load of the linear compressor is smaller than the second reference load.

Also, embodiments disclosed herein provides a computer-readable recording medium on which a computer program for executing the linear compressor control method may be recorded.

In an apparatus for controlling a linear compressor and a control method in accordance with embodiments disclosed herein, an optimal freezing capacity may be increased by way of basically setting a small initial position (or a small initial value) of a piston and electrically moving the initial value of the piston in a high-load driving area. This may result in ensuring control stability and optimizing efficiency of the compressor.

Also, in an apparatus for controlling a linear compressor and a control method thereof in accordance with embodiments disclosed herein, a movement of a piston may be limited based on at least one of a stroke asymmetry ratio based on an initial value of the piston, a comparison result between a motor current and a preset or predetermined motor current peak value, a comparison result between a detected stroke and a preset or predetermined stroke peak value, or a detected top dead center, such that the piston may be prevented from being moved over the stroke peak. This may result in improving durability of the compressor by preventing an impact from being applied to the compressor due to the piston, or preventing a generation of noise due to an impact.

Accordingly, as a stiffness of a spring that elastically supports the piston may be reduced or such spring may be removed, an operation of a low operating frequency may be allowed, resulting in improving efficiency of the compressor.

Also, in an apparatus for controlling a linear compressor and a control method thereof in accordance with embodiments disclosed herein, a virtual capacitor may be applied so as to facilitate an asymmetric control based on a current offset. Also, by virtue of the application of the virtual capacitor, the linear compressor may carry out an LC resonant operation according to an operating frequency so as to be controlled in an unstable area. This may result in enabling a high-efficiency compressor control and reducing a fabricating cost by virtue of a removal of an AC capacitor.

Also, in an apparatus for controlling a linear compressor and a control method thereof in accordance with embodiments disclosed herein, a shortage of voltage applied to a compressor motor under an overload state can be solved by a 2-tap control of reducing a number of turns of a motor coil in an overload state.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for controlling a linear compressor, the apparatus comprising:
    a drive configured to drive the linear compressor based on a control signal;
    a detector configured to detect a motor current of the linear compressor;
    an asymmetric current generator configured to generate an asymmetric motor current by applying a current offset to the detected motor current; and
    a controller configured to generate the control signal based on the asymmetric motor current, wherein the current offset is changed based on a change in a position of a piston of the linear compressor, wherein the current offset is determined based on a comparison result between the motor current and a predetermined motor current peak value or between a detected stroke and a predetermined stroke peak value, wherein the current offset is changed such that the initial value of the piston is moved toward a top dead center or a bottom dead center based on the comparison result, wherein the current offset is changed such that the initial value of the piston is moved toward the top dead center, when the motor current is greater than the predetermined motor current peak value or when the detected stroke is greater than the predetermined stroke peak value, and wherein the current offset is changed such that the initial value of the piston is moved toward the bottom dead center or maintained, when the motor current is smaller than the predetermined motor current peak value or when the detected stroke is smaller than the predetermined stroke peak value.

2. The apparatus of claim 1, wherein the current offset is determined based on an asymmetry ratio of a stroke based on an initial value of the piston, and wherein the current offset is changed such that the initial value of the piston is moved toward the top dead center when the asymmetry ratio of the stroke is greater than a predetermined asymmetry ratio, and wherein the current offset is changed such that the initial value of the piston is moved toward the bottom dead center when the asymmetry ratio of the stroke is smaller than the predetermined desired asymmetry ratio.

3. The apparatus of claim 1, wherein the current offset is changed such that the initial value of the piston is moved toward the bottom dead center when the motor current is smaller than a value obtained by subtracting a predetermined current-changed amount from the predetermined motor current peak value, and when the motor current is greater than the value obtained by subtracting the predetermined current-changed amount from the predetermined motor current peak value the current offset is maintained.

4. The apparatus of claim 1, wherein the current offset is changed, such that the initial value of the piston is moved toward the bottom dead center when the detected stroke is smaller than a value obtained by subtracting a predetermined stroke variation from the predetermined stroke peak value, and when the detected stroke is greater than the value obtained by subtracting a predetermined stroke variation from the predetermined stroke peak value the current offset is maintained.

5. The apparatus of claim 1, wherein the current offset is determined based on a detected top dead center, wherein the current offset is changed such that the initial value of the piston is moved toward the top dead center or the bottom dead center and thus the detected top dead center is '0'.

6. The apparatus of claim 5, wherein the controller detects a stroke based on the asymmetric motor current and a motor voltage of the linear compressor, and generates the control signal based on the detected stroke.

7. The apparatus of claim 6, wherein the controller detects a phase difference between a phase of the asymmetric motor current and a phase of the detected stroke, detects the top dead center of the linear compressor based on the phase difference, and generates the control signal based on the detected top dead center.

8. The apparatus of claim 6, wherein the controller detects a phase difference between a phase of the asymmetric motor current and a phase of the detected stroke, detects a gas spring constant based on the phase difference, the asymmetric motor current, and the detected stroke, and generates the control signal based on the gas spring constant.

9. The apparatus of claim 8, wherein the controller detects a top dead center of the linear compressor based on the gas spring constant, and generates the control signal based on the detected top dead center.

10. The apparatus of claim 1, wherein the current offset is changed according to a change in a load of the linear compressor or a cooling capacity command value applied to the linear compressor.

11. The apparatus of claim 1, wherein the current offset is changed according to an operation mode of the linear compressor, and wherein the operation mode is at least one of a symmetric control mode, an asymmetric control mode, or a counter-asymmetric control mode.

12. The apparatus of claim 11, wherein the operation mode is determined based on a load of the linear compressor or a cooling capacity command value applied to the linear compressor.

13. The apparatus of claim 11, wherein the controller sets the current offset to '0' when the operation mode is the symmetric control mode, and sets the current offset to a value other than '0' when the operation mode is the asymmetric control mode or the counter-asymmetric control mode.

14. The apparatus of claim 13, wherein the current offset when the operation mode is the asymmetric control mode and the current offset when the operation mode is the counter-asymmetric control mode have opposite values to each other.

15. The apparatus of claim 13, wherein the current offset is determined based on at least one of an asymmetry ratio of a stroke based on an initial value of the piston, a comparison result between the motor current and a predetermined motor current peak value, a comparison result between a detected stroke and a predetermined stroke peak value, or a detected top dead center.

16. A linear compressor including the apparatus of claim 1.

17. A refrigerator including the linear compressor of claim 16.

18. A method of controlling a linear compressor, the method comprising:
    detecting a motor current and a motor voltage corresponding to a motor of the linear compressor;
    generating an asymmetric motor current by applying a current offset to the detected motor current;
    generating a control signal based on the asymmetric motor current and the detected motor voltage; and
    driving the linear compressor based on the control signal,
        wherein the current offset is changed based on a change in a position of a piston of the linear compressor,
        wherein the current offset is determined based on a comparison result between the motor current and a predetermined motor current peak value or between a detected stroke and a predetermined stroke peak value,
        wherein the current offset is changed such that the initial value of the piston is moved toward a top dead center or a bottom dead center based on the comparison result, wherein the current offset is changed such that the initial value of the piston is moved toward the top dead center, when the motor current is greater than the predetermined motor current peak value or when the detected stroke is greater than the predetermined stroke peak value, and wherein the current offset is changed such that the initial value of the piston is moved toward the bottom dead center or maintained, when the motor current is smaller than the predetermined motor current peak value or when the detected stroke is smaller than the predetermined stroke peak value.

19. A linear compressor controlled using the method of claim 18.

20. A refrigerator including a linear compressor controlled using the method of claim 18.

* * * * *